(12) United States Patent
Stam

(10) Patent No.: US 6,389,154 B1
(45) Date of Patent: May 14, 2002

(54) EXACT EVALUATION OF SUBDIVISION SURFACES GENERALIZING BOX SPLINES AT ARBITRARY PARAMETER VALUES

(75) Inventor: Jos Stam, Seattle, WA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/116,553

(22) Filed: Jul. 15, 1998

(51) Int. Cl.$^7$ .................................................. G06K 9/00
(52) U.S. Cl. ........................ 382/108; 382/100; 345/582
(58) Field of Search ................................ 382/108, 154, 382/136; 356/369; 364/900, 508; 345/425–427, 582; 359/798; 351/212

(56) References Cited

U.S. PATENT DOCUMENTS

| | | | | |
|---|---|---|---|---|
| 4,667,306 A | * | 5/1987 | Smith | 364/900 |
| 4,969,106 A | * | 11/1990 | Vogel et al. | 364/508 |
| 5,144,495 A | * | 9/1992 | Merton et al. | 359/798 |
| 5,353,389 A | * | 10/1994 | Fiasconaro | 395/119 |
| 5,835,220 A | * | 11/1998 | Kazama et al. | 356/369 |
| 5,859,919 A | * | 1/1999 | Holland et al. | 382/108 |
| 6,009,190 A | * | 12/1999 | Szeliski et al. | 382/154 |
| 6,018,349 A | * | 1/2000 | Szeliski et al. | 345/425 |
| 6,037,949 A | * | 3/2000 | Derose et al. | 345/430 |

OTHER PUBLICATIONS

Ball et al., "Conditions for Tangent Plane Continuity Over Recursively Defined B–Spline Surfaces", ACM Transactions on Graphics, 7(2):83–102, Apr. 1988.

Catmull et al., "Recursively Generated B–Spline Surfaces on Arbitrary Topological Meshes", Computer Aided Design 10(6):350–355, 1978.

Doo et al., "Behaviour of Recursive Subdivison Surfaces Near Extraordinary Points", Computer Aided Design 10(6):356–360, 1978.

Halstead et al., "Efficient, Fair Interpolation Using Catmull–Clark Surfaces", in Proceedings of SIGGRAPH '93, pp. 35–44, Addison–Wesley Publishing Company, Aug. 1993

Hoppe, "Piecewise Smooth Surface Reconstruction", in Proceedings of SIGGRAPH '94, pp. 295–302, Addison–Wesley Publishing Company, Aug. 1994.

Kohler et al., "Efficient Calculation of Subdivision Surfaces for Visualization", *Visualization and Mathematics*, Springer, pp. 165–179, 1997.

Loop, "Smooth Subdivision Surfaces Based on Triangles", M.S. Thesis, Department of Mathematics, University of Utah, Aug. 1987.

(List continued on next page.)

*Primary Examiner*—Leo Boudreau
*Assistant Examiner*—Barry Choobin
(74) *Attorney, Agent, or Firm*—Staas & Halsey, LLP

(57) ABSTRACT

A computer-based method for determining a property of a location on a computer surface model where the location is described by a set of parameters and the surface model is described by a set of control vertices having a corresponding set of subdivision rules, and the control vertices admit a parameterization of regular sets of control vertices, includes receiving input specifying coordinates of control vertices that describe the surface model, projecting the specified coordinates of the control vertices into an eigenspace derived from a matrix representation of the subdivision rules to produce a set of projected control vertices, determining which of a hierarchically nested set of regular tiles of the surface model contains the location, and evaluating the location as a function of a valence of one of the control vertices, the determined nested tile, and the set of projected control vertices. The evaluated location is stored in a computer memory.

49 Claims, 21 Drawing Sheets

OTHER PUBLICATIONS

Peters et al., "Analysis of Algorithms Generalizing B-Spline Subdivision" to appear in SIAM Journal of Numerical Analysis.

Reif, "A Unified Approach to Subdivision Algorithms Near Extraordinary Vertices", Computer Aided Geometric Design 12:153–174, 1995.

Robertson, "Meet Geri The New Face of Animation", Computer Graphics World, pp. 20–28, Feb. 1998.

Warren, "Subdivision Methods for Geometric Design", unpublished manuscript, Nov. 15, 1995.

Zorin, "Subdivision and Multiresolution Surface Representations", Ph.D. Thesis, CalTech, Pasadena, CA, 1997.

International Search Report, Int'l Appl. No. PCT/US99/15782, Oct. 18, 1999, 2 pages.

C. Mandal et al., Dynamic Smooth Subdivision Surfaces for Data Visualization, XP–002118444, 1997, pps. 371–377.

Ulrich Reif, "A unified approach to subdivision algorithms near extraordinary vertices", Computer Aided Geometric Design, XP–002118445, 1995, pps. 153–174.

Mark Halstead et al., "Efficient, Fair Interpolation using Catmull–Clark Surfaces", XP–002118446, 1993, Computer Graphics Proceedings, 1993, pp. 35–44.

* cited by examiner

EXACT EVALUATION OF SUBDIVISION SURFACES GENERALIZING BOX SPLINES AT ARBITRARY PARAMETER VALUES

BACKGROUND OF THE INVENTION

Computers offer increasingly sophisticated methods of modeling surfaces. Applications of these surface models range from producing realistic display images to providing simulations with accurate surface information.

Referring to FIG. 1, a free-form surface 10 appears in three-dimensional space (e.g., displayed on a computer monitor). Referring to FIG. 2, a surface 10 in a computer modeling program can be thought of as being covered by a connected set of surface patches 12, 14 such as bicubic surface spline patches. One common type of bicubic surface spline is a Bezier-Spline (B-Spline). Referring to FIG. 3, control vertices 16 offer computer surface modelers an intuitive method of controlling the contour of a selected patch 12. Moving a control vertex 16 causes a corresponding change in the contour of patch 12. For example, moving control vertex 16a could significantly alter the coordinates' of the upper right portion of patch 12. To a lesser extent, the movement of control vertex 16a may also effect the lower left portion of patch 12.

Referring again to FIG. 2, each patch of the surface 10 has a corresponding set of control vertices. Adjoining patches (e.g., patch 12 and patch 14) share control vertices. Thus, moving a single control vertex affects several neighboring surface patches. However, this movement has no effect on patches not sharing the moved control vertex. Thus, control vertices 16 provide a convenient tool for adjusting contours of a local area of neighboring patches.

Referring to FIG. 4, although a graphical user interface (GUI) that allows a user to visually move control vertices (e.g., by selecting and dragging a control vertex) may shield a modeler from the mathematics involved, the coordinates of the control vertices 16 act as the coefficients of a set of functions 22 that can determine the contour of a B-Spline patch 12 in three-dimensions. Sixteen B-Spline basis functions 22, labeled $b_1$–$b_{16}$ in FIG. 4, translate a set of parameters u and v 20 that describe a surface location (e.g., the u and v values that describe coordinates of surface location 20 within two-dimensional plane 18) into the coordinates of the location in three-dimensions 24. The process shown in FIG. 4 is known as parameterization. A wide variety of techniques exist for working with parameterized surfaces.

Referring to FIG. 5, subdividing control vertices (i.e., determining a new set of control vertices based on a previous set of control vertices) enables a modeler to gain greater control of over a finer set of patches. Subdivision rules guide determination of new control vertices from existing control vertices. Many different subdivision rules exist. For example, Catmull-Clark subdivision rules produce new control vertices 28 from a set of original control vertices 16 that control a B-Spline patch 12. Catmull-Clark surfaces have many properties which make them attractive as a free-form surface design tool. For example, regardless of the initial topology of a set of control vertices, after a single application of Catmull-Clark subdivision rules, the faces formed by the new control vertices form quadrilaterals. Further, a wide variety of algorithms have been written for these surfaces, for example, fairing algorithms that reduce unwanted surface undulation.

To understand subdivision rules, it is helpful to imagine each control vertex 16 as a corner of a polygon. Catmull-Clark subdivision rules insert new control vertices 28 in the middle of each polygon face formed by the original control vertices 16 and in the middle of each polygon edge other than the outermost edge of the set of polygons. The new set of control vertices 28 also includes original control vertices 16 other than the outermost original control vertices 16. Application of subdivision rules to original control vertices 16 does not, without movement of a new control vertex 28, alter the contour of patch 12. Subsets of the new control vertices 28, however, offer control over sub-patches, essentially making four smaller new patches out of the original surface patch 12. For example, new control vertices 28a–28p control sub-patch 26 of original patch 12. However, B-Spline basis functions (and the basis functions for other surface geometries) can only evaluate a surface when the arrangement of control vertices conform to a rigid set of constraints.

Referring to FIG. 6A, a set of control vertices 30, also known as a "mesh", defines a smooth surface. Each control vertex 30 has a valence corresponding to the number of edges that meet at the vertex. For example, control vertex 32a which appears at the meeting point of three edges has a valence of three. In the case of a free-form surface divided into quadrilateral patches, a vertex having a valence not equal to four is called an extraordinary vertex. FIG. 6A includes three extraordinary vertices. Vertices 32a and 32c have a valence of three. Vertex 32b has a valence of five.

A surface patch controlled by a regular set of control vertices (i.e., a set of control vertices having no extraordinary control vertices) can be evaluated using the basis functions shown in FIG. 4. FIGS. 6A–6C shade regular faces formed by sets of regular control vertices. Referring to FIG. 6B, application of Catmull-Clark subdivision rules to the control vertices 30 of FIG. 6A produces a new set of the control vertices 30'. In turn, FIG. 6C illustrates application of the subdivision rules to the control points 30' of FIG. 6B which produce yet another set of control points 30". As shown in FIGS. 6A–6C, the portion of the surface comprised of shaded regular patches grows with each subdivision. Patches adjacent to the extraordinary vertices 32a–32c, while shrinking with each application of the subdivision rules, nevertheless remain irregular and, hence, cannot be evaluated with the basis functions developed for regular patches (FIG. 4). Further, each subdivision consumes significant computing resources as software tracks increasing numbers of control vertices.

SUMMARY OF THE INVENTION

In general, in one aspect, a computer-based method for determining a property of a location on a computer surface model where the location is described by a set of parameters and the surface model is described by a set of control vertices having a corresponding set of subdivision rules, and the control vertices admit a parameterization of regular sets of control vertices, includes receiving input specifying coordinates of control vertices that describe the surface model, projecting the specified coordinates of the control vertices into an eigenspace derived from a matrix representation of the subdivision rules to produce a set of projected control vertices, determining which of a hierarchically nested set of regular tiles of the surface model contains the location, and evaluating the location as a function of a valence of one of the control vertices, the determined nested tile, and the set of projected control vertices. The evaluated location is stored in a computer memory.

Embodiments of the computer-based method may include the following. One of the control vertices may be a control vertex having an extraordinary valence. The subdivision rules may include Catmull-Clark and/or Loop subdivision rules. The evaluating may determine coordinates of the location. The evaluating may determine a derivative of any order of the surface model at the location. The computer-based method may also include processing the evaluation to determine a display characteristic such as shading or texture mapping. The evaluating may be done according substantially to:

$$s(u, v) = \sum_{i=1}^{K} \varphi_i(u, v) p_i.$$

as described below. The evaluating may be done according substantially to:

$$s(v, w) = \hat{C}_0^T \Phi(v, w).$$

as described below. The computer-based method may produce a graphics display based on the evaluation. The projecting may include reading data from a file that includes inverse eigenvector matrix data of the eigenspace. The computer-based method may include reading data from a file that includes eigenvalue and eigenvector data of the eigenspace. Input may be received via a graphical user interface or via program variables.

In general, in one aspect, a computer-based method of evaluating a location of a computer surface model where the location is specified by a set of parameters and the surface is described by a set of control vertices having a corresponding set of subdivision rules, and the control vertices admit a parameterization of regulars sets of control vertices, and where one of the control vertices being a vertex having an extraordinary valance, includes receiving input specifying coordinates of the control vertices, evaluating the location as a function of the control vertices without explicitly subdividing the control vertices in accordance with the subdivision rules, and storing the evaluated location in a computer memory.

In general, in one aspect, a computer program product, disposed on a computer readable medium, for determining a property of a location on a computer surface model, where the location is specified by a set of parameters and the surface is described by a set of control vertices having a corresponding set of subdivision rules, and the control vertices admit a parameterization of regular sets of control vertices, includes instructions for causing a computer to receive input specifying coordinates of the control vertices, project the specified coordinates of the control vertices into an eigenspace derived from a matrix representation of the subdivision rules to produce a set of projected control vertices, determine which of a hierarchically nested set of regular tiles contains the location, and evaluate the location as a function of a valence of one of the control vertices, the determined nested tile, and the set of the projected control vertices. The evaluated location is stored in a computer memory.

Advantages may include one or more of the following.

Evaluation of a surface which admits a parameterization on a regular part of the control mesh requires no explicit subdividing, thus reducing programming complexity and consumption of processing resources. The evaluation computations are easily implemented and efficient. The techniques described can be used to quickly produce high quality curvature plots of subdivision surfaces. The computational cost of evaluation is comparable to that of a bi-cubic spline. The rapid and precise evaluation of a surface is crucial for many standard operations on surfaces such as picking, rendering and texture mapping. The evaluation technique further allows a large body of useful techniques from parametric surfaces to be transferred to subdivision surfaces, making them even more attractive as a free-form surface modeling tool.

Other features and advantages will be apparent from the following detailed description including the drawings and from the claims.

DESCRIPTION OF THE PREFERRED EMBODIMENTS

The following describes techniques that can evaluate patches at any location regardless of the presence of an extraordinary vertex. Investigation of the mathematics of subdivision help in understanding these techniques.

Figure 1:
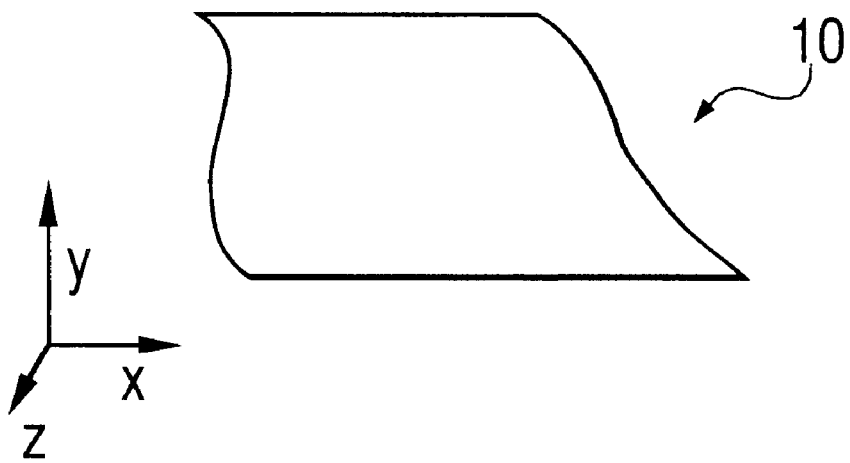
FIG. 1 is a diagram illustrating a free-form surface.
Figure 2:
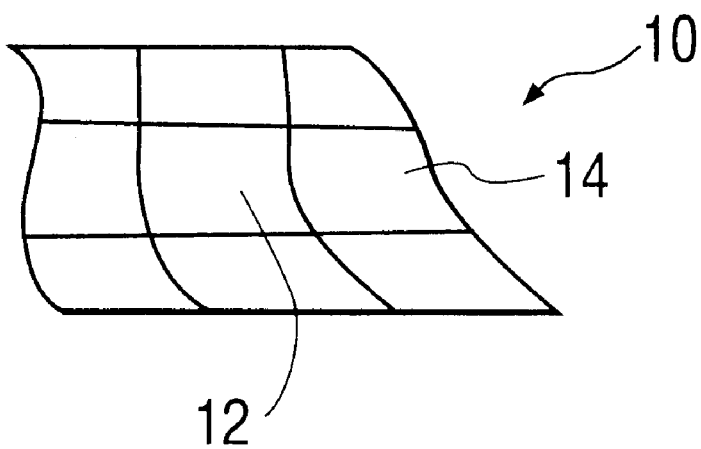
FIG. 2 is a diagram illustrating division of the free-form surface into a set of regular patches.
Figure 3:
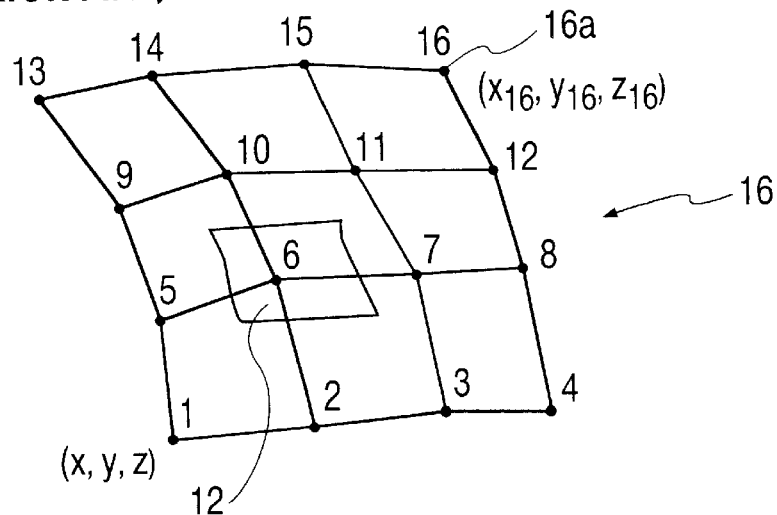
FIG. 3 is a diagram illustrating control vertices that control the contour of a regular surface patch.
Figure 7A:
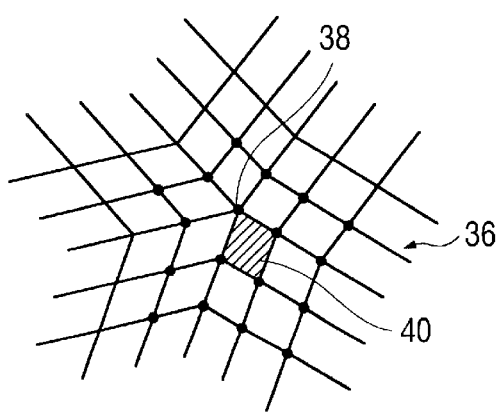
FIGS. 7A and 7B are diagrams illustrating an extraordinary vertex.
Figure 7B:
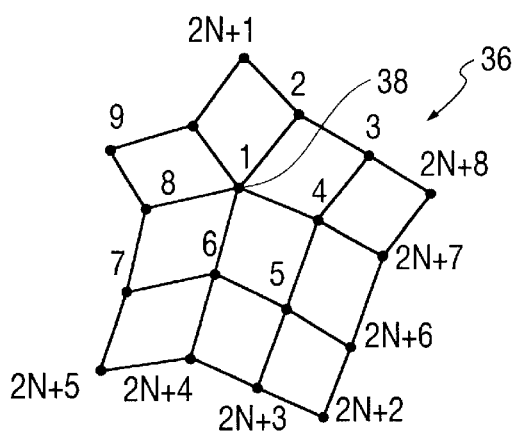

Referring again to FIG. 3, a set of sixteen control vertices 16 define a bi-cubic B-spline. The numbering of the vertices 16 shows their ordering in the corresponding B-spline basis functions denoted b(u,v) in FIG. 4. Referring to FIGS. 7A and 7B, a surface patch 40 includes an extraordinary vertex 38 having a valence of N=5 where the symbol N denotes vertex valence. FIG. 7B shows the ordering of control vertices 36 from 1 to 2N+8. Because the control vertex structure 36 near an extraordinary vertex 38 does not form a simple rectangular grid, faces containing extraordinary vertices cannot be evaluated as uniform B-splines.

Figure 8A:
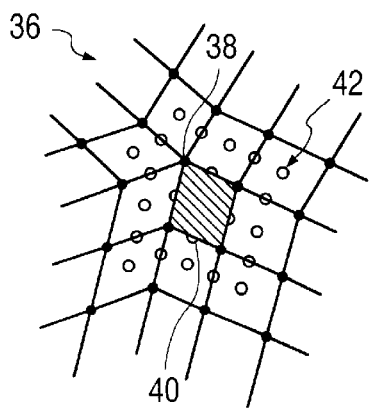
FIGS. 8A and 8B are diagrams illustrating the effect of Catmull-Clark subdivision rules upon a set of control vertices that includes an extraordinary vertex.
Figure 8B:
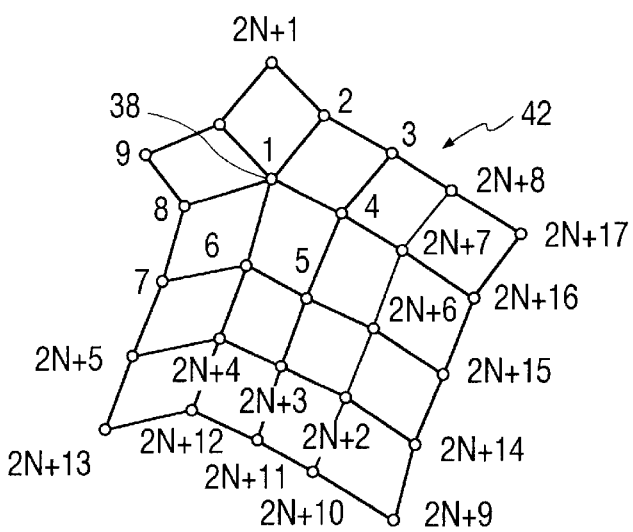

Referring to FIGS. 8A and 8B, using Catmull-Clark subdivision rules to subdivide the initial control vertices at least twice isolates the extraordinary vertices so that each face is a quadrilateral and contains at most one extraordinary vertex. Given a single extraordinary vertex of valence N, the techniques described herein define a function s(u,v) that can quickly evaluate a location anywhere on the patch 40 without explicitly subdividing (i.e., using subdivision rules to generate new control vertices from existing ones). The function s(u,v) is defined over a unit square $\Omega=[0,1]\times[0,1]$ and can be evaluated directly in terms of the K=2N+8 vertices 36 that influence the shape of the patch 40. Thus, $\Omega$ defines a coordinate system where s(0,0) is the surface point corresponding to the extraordinary vertex 38. The orientation of $\Omega$ is chosen such that $s_u \times s_v$ points outside of the surface.

While the techniques described herein obviate the need for explicit subdivision when evaluating a surface location, a mathematical understanding of subdivision helps to understand these techniques.

Referring again to FIG. 7B, the coordinates of original control vertices 38 can be mathematically expressed as a vector of control vertices:

$$C_0^T = (c_{0,1}, \ldots, c_{0,K}).$$

Figure 4:
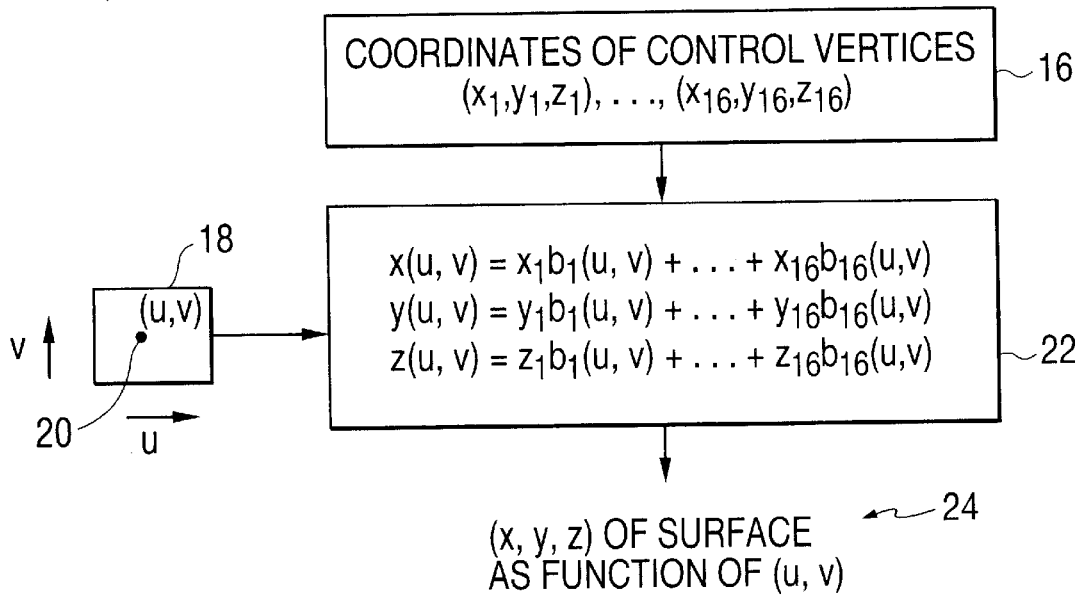
FIG. 4 is a flowchart illustrating how control vertices mathematically control the contour of a regular surface patch.
Figure 5:
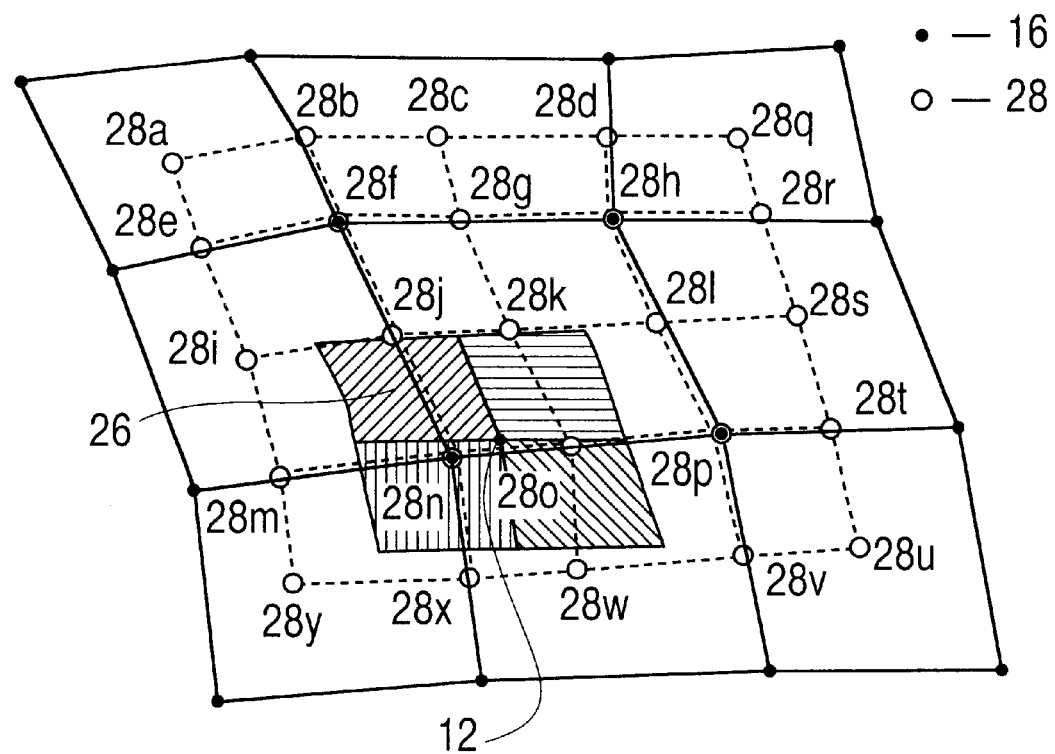
FIG. 5 is a diagram illustrating application of Catmull-Clark subdivision rules.
Figure 6A:
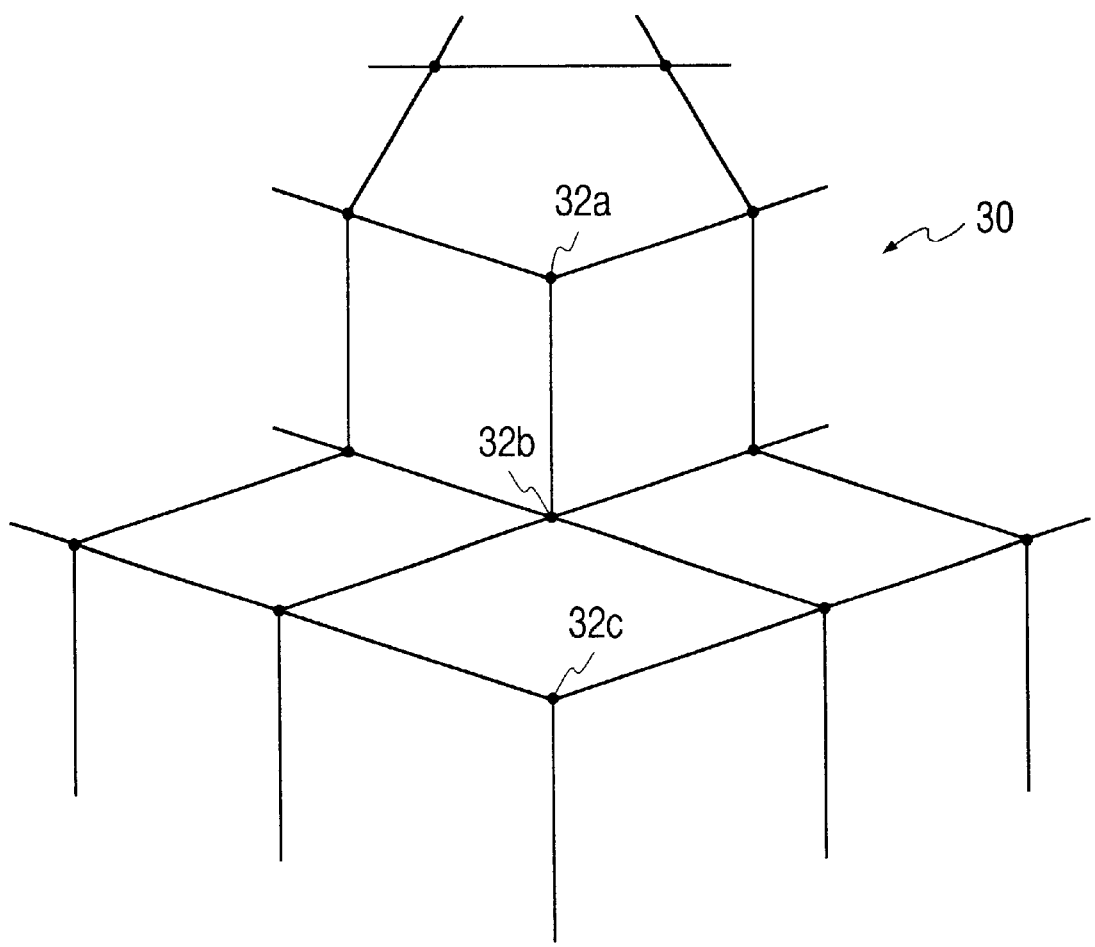
FIGS. 6A–6C are diagrams illustrating the effect of extraordinary vertices upon surface evaluation.
Figure 6B:
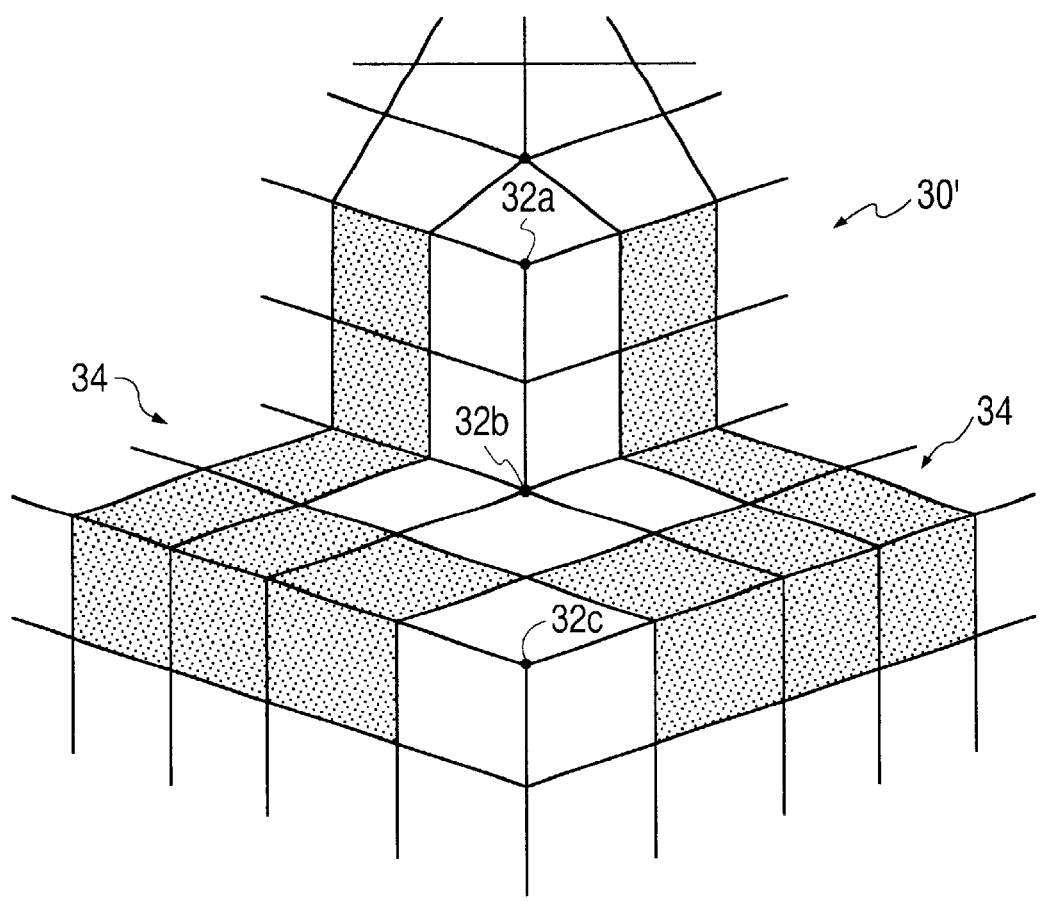
Figure 6C:
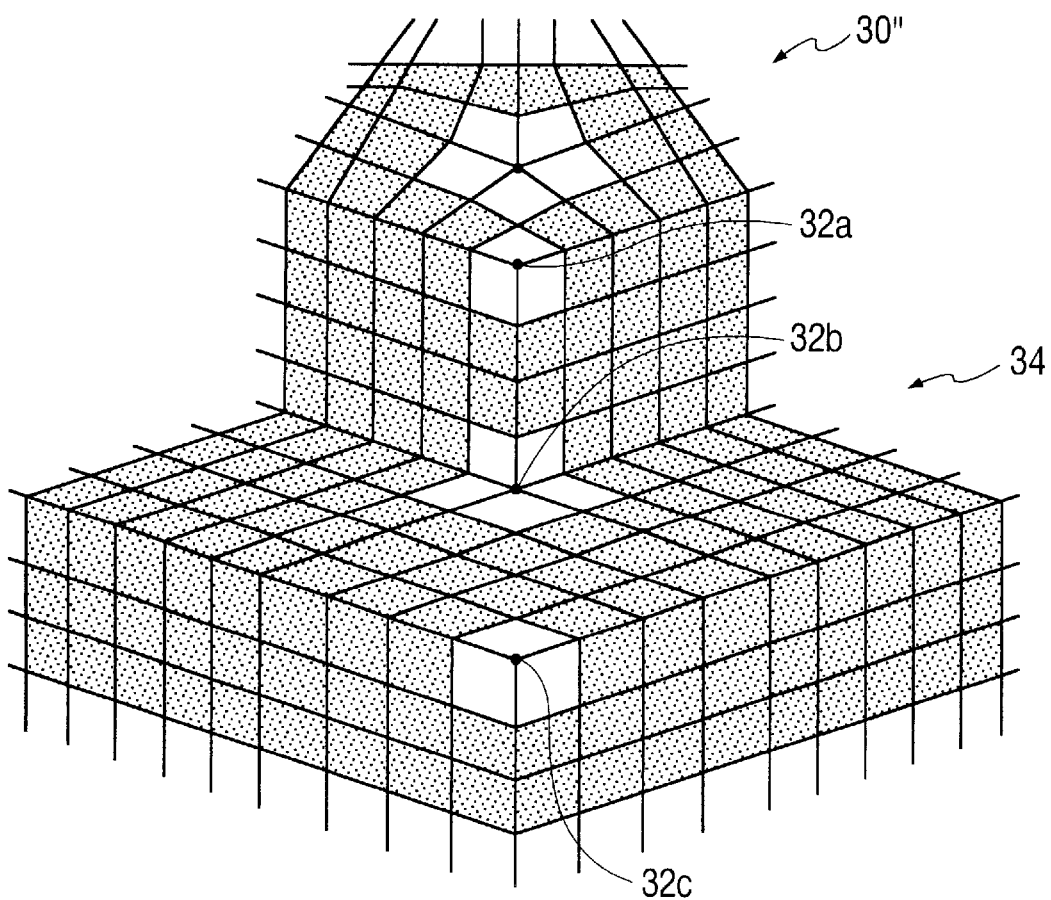

The ordering of the control vertices 38, especially in a data structure stored in a computer program (described below) as shown in FIG. 7B makes later computations more tractable. As shown, the control vertices 36 do not result in a regular set of sixteen control vertices that control a uniform bi-cubic B-spline patch as shown in FIG. 4.

Referring to FIGS. 8A and 8B, Catmull-Clark subdivision of the original control vertices 36 can generate a new set of M=K+9 control vertices 42 shown as circles super-imposed on the original vertices 36 in FIG. 8A.

Figure 9:
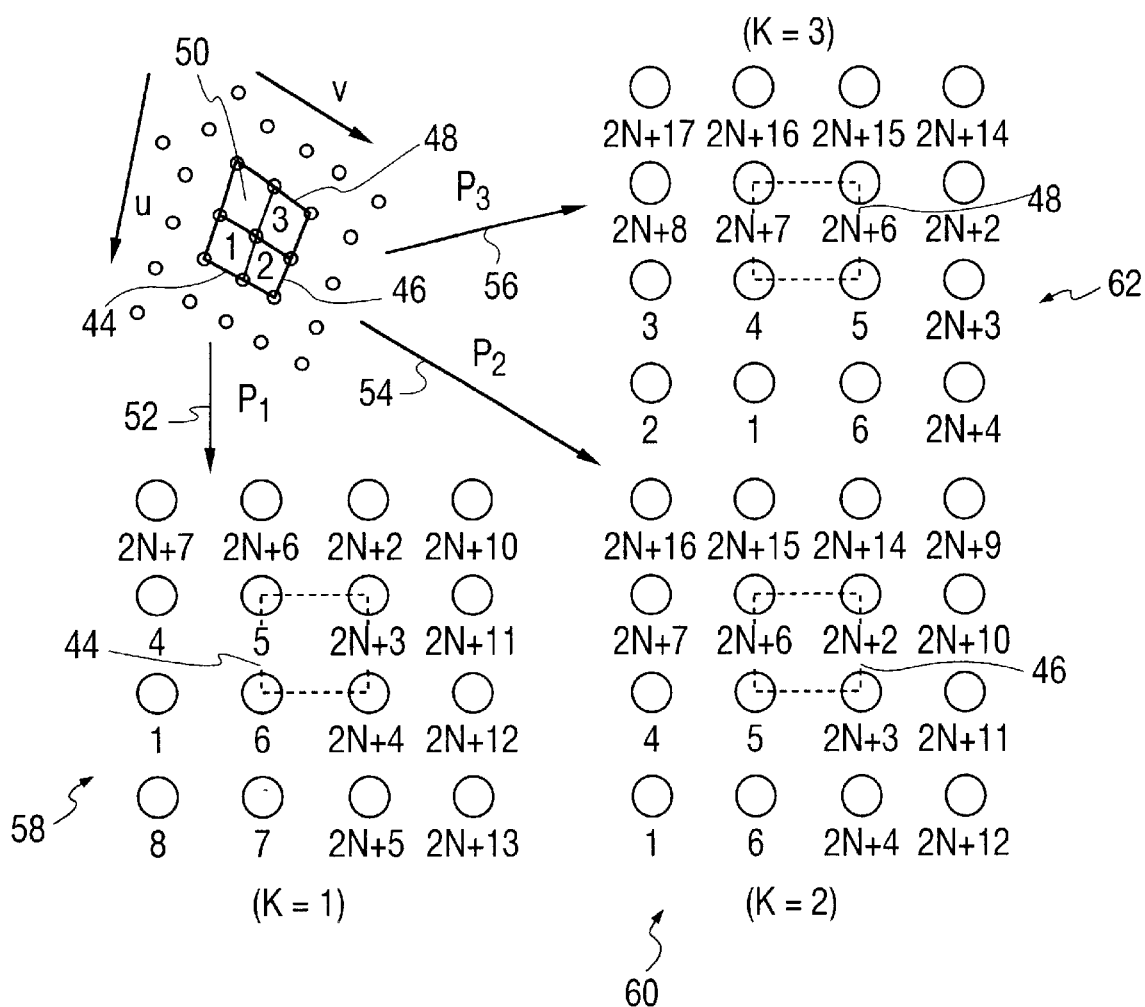
FIG. 9 is a diagram illustrating how subdivision produces a set of regular surface patches.

Referring to FIG. 9, subsets of the control vertices 42 produced by subdivision are control vertices of three uniform B-spline patches 44, 46, 48. Hence, explicit subdivision has parameterized three-quarters of the original surface patch 40. That is, any surface location found in these three parameterized portions can be evaluated as a function of the new control vertices and the parameters u and v.

The set of control vertices 42 produced by subdivision is expressed by:

$$C_1^T = (c_{1,1}, \ldots, c_{1,K}) \text{ and } \overline{C}_1^T = (C_1^T, c_{1,K+1}, \ldots, c_{1,M})$$

where $c_{1,1}$ to $c_{1,k}$ represent control vertices neighboring the extraordinary vertex after subdivision, and $c_{1,K+1}$ to $c_{1,M}$ represent control vertices at. least one vertex removed from the extraordinary vertex. Catmull-Clark subdivision can be expressed as matrix multiplication by a K×K extended subdivision matrix A. Thus:

$$C_1 = AC_0. \tag{1}$$

Due to the ordering chosen for the vertices, the extended subdivision matrix has the following structure:

$$A = \begin{pmatrix} S & 0 \\ S_{11} & S_{12} \end{pmatrix}, \tag{2}$$

where S is a 2N+1×2N+1 subdivision matrix that subdivides control vertices neighboring the extraordinary vertex and the remaining sub-matrices correspond to regular midpoint knot insertion rules for B-splines. Definitions of the matrices appear in Appendix A. The additional points needed to evaluate the three B-spline patches are defined using a bigger matrix $\overline{A}$ of size M×K $$\overline{C}_1 \overline{A} C_0,$$

where $$\overline{A} = \begin{pmatrix} S & 0 \\ S_{11} & S_{12} \\ S_{21} & S_{22} \end{pmatrix} \tag{3}$$

A definition of matrix $\overline{A}$ also appears in Appendix A.

The subdivision performed by equation (1) can be repeated to produce an infinite sequence of control vertices where:

$$C_n = AC_{n-1} = A^n C_0$$

and $$\overline{C}_n = \overline{A} C_{n-1} = \overline{A} A^{n-1} C_0, n \geq 1.$$

Referring to FIG. 9, for each level $n \geq 1$, a subset of the vertices of $C_n$ become control vertices of three B-spline patches 44, 46, 48. These control vertices can be defined by selecting sixteen control vertices from $C_n$ and storing them in "picking" matrices $P_1$ 52, $P_2$ 54, and $P_3$ 56 that select control vertices. Hence, the three B-spline patches 42, 44, and 46 correspond to:

$$B_{k,n} = P_k \overline{C}_n,$$

where $P_k$ is a 16×M picking matrix that selects control vertices 58, 60, 62 corresponding to the three B-spline patches designated by k=1,2,3.

Let b(u,v) be the vector containing the sixteen cubic B-spline basis functions (described in Appendix B). As ordered, a surface patch corresponding to each matrix of control vertices is defined as:

$$s_{k,n}(u,v) = B_{k,n}^T b(u,v) = \overline{C}_n^T P_k^T b(u,v), \tag{4}$$

where $(u,v) \in \Omega$, $n \geq 1$, and k=1,2,3. The definition of the picking matrices P appears near the end of the specification.

Figure 10:
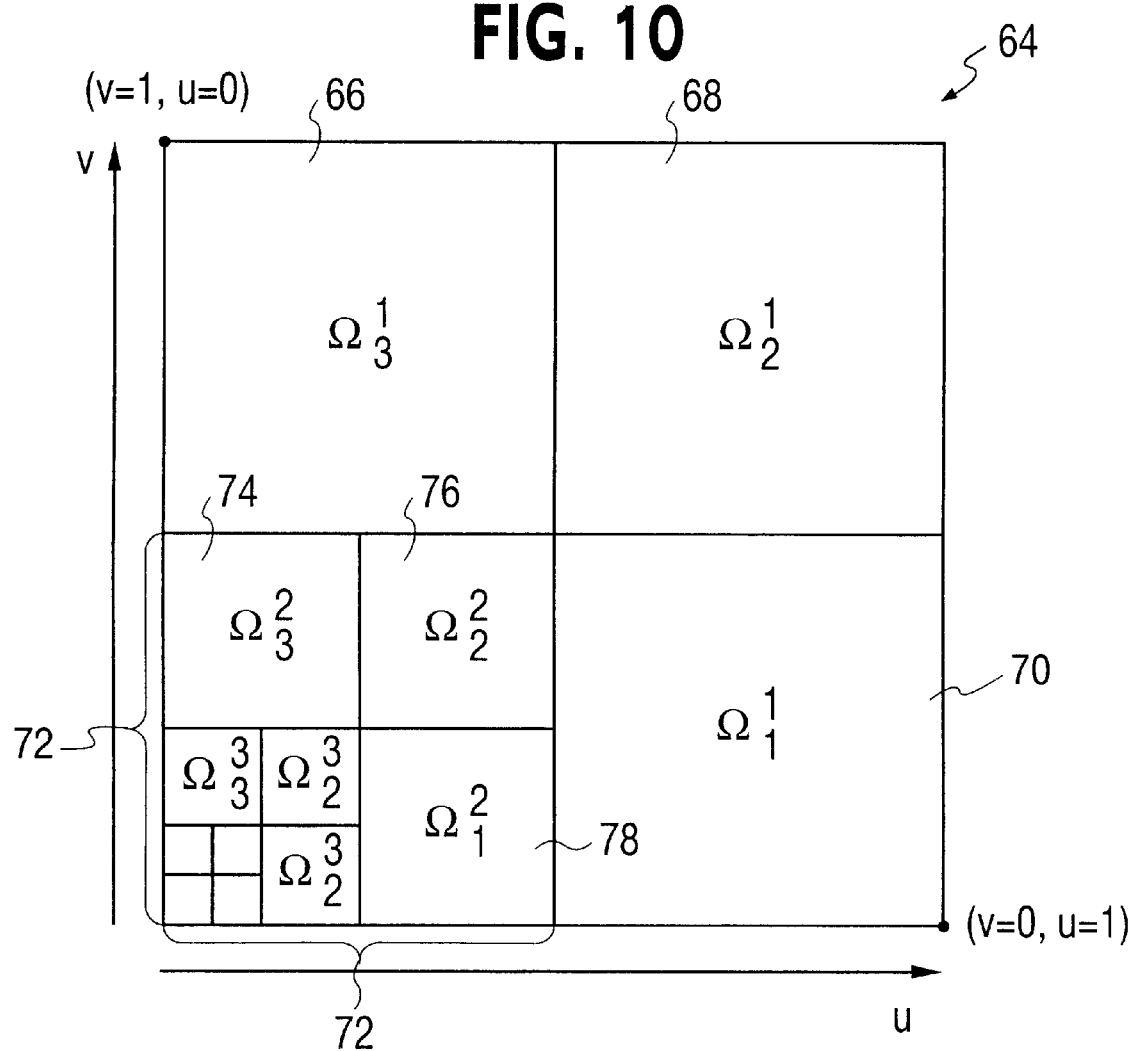
FIG. 10 is a diagram illustrating a hierarchically nested set of tiles that form a unit domain.

Referring to FIG. 10, equation (4) describes a hierarchy of nested surface patches. Each of the surface patches is defined over a that tile forms a $\Omega^n_k$ unit domain where n, the superscript, specifies a hierarchy level and k, the subscript, specifies a particular tile within a specified hierarchical level. For example, unit tile 70 is in the first tile of the first hierarchical level, while unit tile 74 is the third tile of the second hierarchical level. Each domain corresponds to a regular B-Spline patch.

The infinite sequence of uniform B-spline patches defined by equation (4) and shown in FIG. 10 form a surface s(u,v)

when stitched together. More formally, a unit square $\Omega$ includes an infinite set of tiles $\{\Omega^n_k\} n \geq 1, k=1,2,3$. As shown in FIG. 10 each tile with index n is four times smaller than the tiles with index n−1. More precisely, the dimensions of a sub-patch is given by:

$$\Omega_1^n = [1/2^n, 1/2^{n-1}] \times [0, 1/2^n],$$

$$\Omega_2^n = [1/2^n, 1/2^{n-1}] \times [1/2^n, 1/2^{n-1}],$$

$$\Omega_3^n = [0, 1/2^n] \times [1/2^n, 1/2^{n-1}]. \quad (5)$$

A parameterization for s(u,v) is constructed by defining its restriction to each tile $\Omega^n_k$ to be equal to the B-spline patch defined by the control vertices $B_{k,n}$:

$$s(u,v)|\Omega^n_k = s_{k,n}(t_{k,n}(u,v)). \quad (6)$$

A transformation $t_{k,n}$ maps the tile $\Omega^n_k$ onto the unit square $\Omega$:

$$t_{1,n}(u, v) = (2^n u - 1, 2^n v), \quad (7)$$

$$t_{2,n}(u, v) = (2^n u - 1, 2^n v - 1) \quad (8)$$

and $$t_{3,n}(u, v) = (2^n u, 2^n v - 1). \quad (9)$$

Equation (6) gives a parameterization of a surface without explicit subdivision (i.e., computing new sets of control vertices). However, it is very costly to evaluate, since it involves n−1 multiplications of the K×K matrix A. Computing the eigenstructure of A can greatly reduce the computational cost of evaluating a surface location.

The eigenstructure of the subdivision matrix A is defined as the set of its eigenvalues and eigenvectors. The matrix A is non-defective (i.e., diagonalizable) for any valence. Consequently, there exists K linearly independent eigenvectors. Therefore, this eigenstructure is denoted by $(\Lambda, v)$, where $\Lambda$ is a diagonal matrix containing the eigenvalues of A, and V is an invertible matrix whose columns are the corresponding eigenvectors. Computation of the eigenstructure is then equivalent to the solution of the following matrix equation:

$$AV = V\Lambda, \quad (10)$$

where the i-th diagonal element of $\Lambda$ is an eigenvalue with a corresponding eigenvector equal to the i-th column of the matrix V (i=1, ..., K). There are many numerical algorithms which compute solutions for such equations. Unfortunately, these algorithms do not always return the correct eigenstructure. For example, in some cases these algorithms return complex eigenvalues. For this reason, the eigenstructure is explicitly computed. Since the subdivision matrix has a definite block structure, the eigenstructure computation can be done in several steps.

Appendix A contains computation of the eigenstructure $(\Sigma_1, U_0)$ (with respect to $(\Delta_1, W_1)$) of the diagonal block S (with respect to $S_{12}$) of the subdivision matrix defined in equation (2). The eigenvalues of the subdivision matrix are the union of the eigenvalues of its diagonal blocks:

$$\Lambda = \begin{pmatrix} \Sigma & 0 \\ 0 & \Delta \end{pmatrix}.$$

Using the eigenvectors of S and $S_{12}$, it can be proven that the eigenvectors for the subdivision matrix must have the following form:

$$V = \begin{pmatrix} U_0 & 0 \\ U_1 & W_1 \end{pmatrix}.$$

The matrix $U_1$ is unknown and is determined from equation (10). Replacing the matrices $\Lambda$, V and A by their block representations, the following matrix equation is obtained:

$$S_{11}U_0 + S_{12}U_1 = U_1 \Sigma. \quad (11)$$

Since $U_0$ is known, $U_1$ is computed by solving the 2N+1 linear systems of equation (11). In principle, this equation could be solved symbolically. In practice, however, because of the small sizes of the linear systems, the solution can be computed up to machine accuracy as described below. The inverse of the eigenvector matrix is equal to:

$$V^{-1} = \begin{pmatrix} U^{-1} & 0 \\ -W_1^{-1} U_1 U_0^{-1} & W_1^{-1} \end{pmatrix}, \quad (12)$$

where both $U_0$ and $W_1$ can be inverted exactly (see Appendix A). Therefore, equation (10) can be rewritten:

$$A = V \Lambda V^{-1}$$

This decomposition enables construction of a fast evaluation scheme of the surface patch. The subdivided control vertices at level n can be rewritten:

$$\bar{C}_n = \bar{A} A^{n-1} C_0 = \bar{A} V \Lambda^{n-1} V^{-1} C_0 = \bar{A} V \Lambda^{n-1} \hat{C}_0,$$

where $\hat{C}_n = V^{-1} C_n$ is the projection of the K control vertices into the eigenspace of the subdivision matrix. Using this new expression for the control vertices at the n-th level of subdivision, equation (4) can be rewritten in the following form:

$$s_{k,n}(u, v) = \hat{C}_0^T \Lambda^{n-1} (P_k \bar{A} V)^T b(u, v).$$

The right most terms in this equation are independent of the control vertices and the power n. Therefore, this expression can be precomputed and define the following three vectors:

$$x(u, v, k) = (P_k \bar{A} V)^T b(u, v) k=1,2,3. \quad (13)$$

The components of these three vectors correspond to a set of K bi-cubic splines. Appendix B shows how to compute these splines. The splines $x_i(u, v, k)$ depend only on the valence of the extraordinary vertex. Consequently, the equation for each patch can be compactly written as:

$$s_{k,n}(u, v) = \hat{C}_0^T \Lambda^{n-1} x(u, v, k) k=1,2,3. \quad (14)$$

To make the expression for the evaluation of the surface patch more concrete, let $P_i^T$ denote the rows of $\hat{C}_0$. Then the surface patch can be evaluated as:

$$s(u, v) | \Omega_k^n = \sum_{i=1}^{K} (\lambda_i)^{n-1} x_i(t_{k,n}(u, v), k) p_i. \quad (15)$$

Therefore, in order to evaluate the surface patch, the new control vertices $P_i$ must be computed. This computation need only be done once for a given set of control vertices. Next, for each evaluation, n must be determined and the contribution from each of the splines must be scaled by the relevant eigenvalue to the power n−1. Since all but the first of the eigenvalues are smaller than one, their contribution decreases as n increases. Thus, for large n, i.e., for surface-points near the extraordinary vertex, only a few terms make a significant contribution. In fact for (u, v)=(0,0) the surface point is $P_1$, which agrees with the definition of a limit point.

Alternatively, the bi-cubic spline functions x(u, v, k) can be used to define a set of eigenbasis functions for the subdivision. For a given eigenvector $\lambda_i$, the function $\phi_i$ can be defined by its restrictions on the domains $\Omega_L^n$ as follows:

$$\phi_i(u, v)|\Omega_k^n = (\lambda_i)^{n-1} x_i(t_{k,n}(u, v), k),$$

with i−1, . . . , K. By the above definition, these functions satisfy the following scaling relation:

$$\phi_i(u/2, v/2) = \lambda_i \phi_i(u, v).$$

Explicit analytical expressions for particular eigenbases can be computed.

Figure 11:
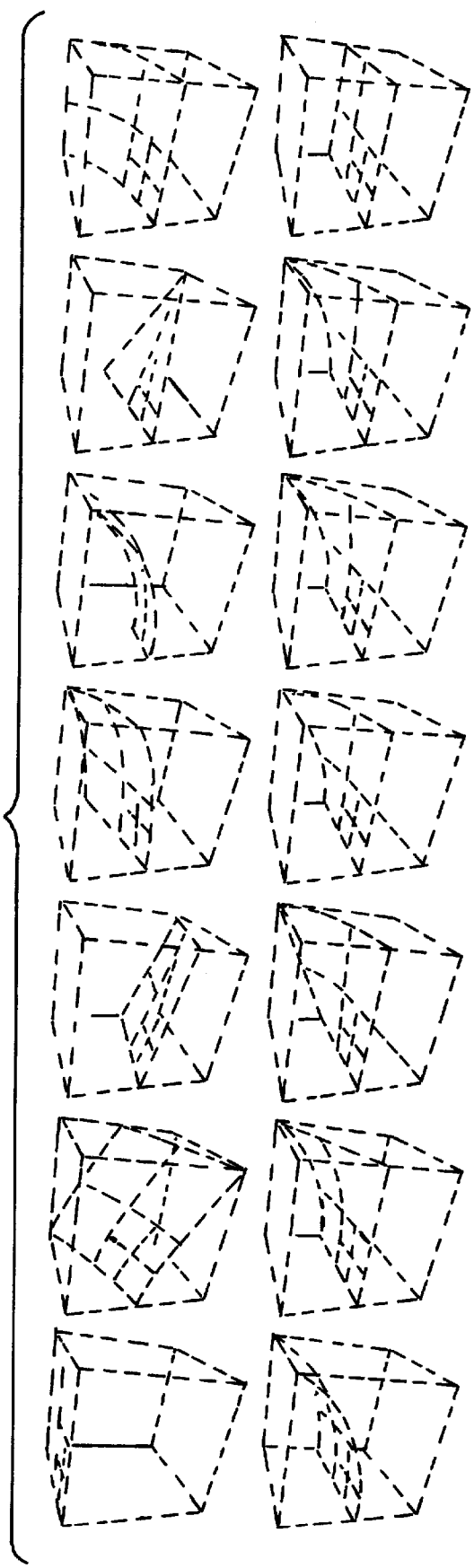
FIG. 11 are pictures illustrating eigenbasis functions for extraordinary vertices having a valence of N=3.
Figure 12:
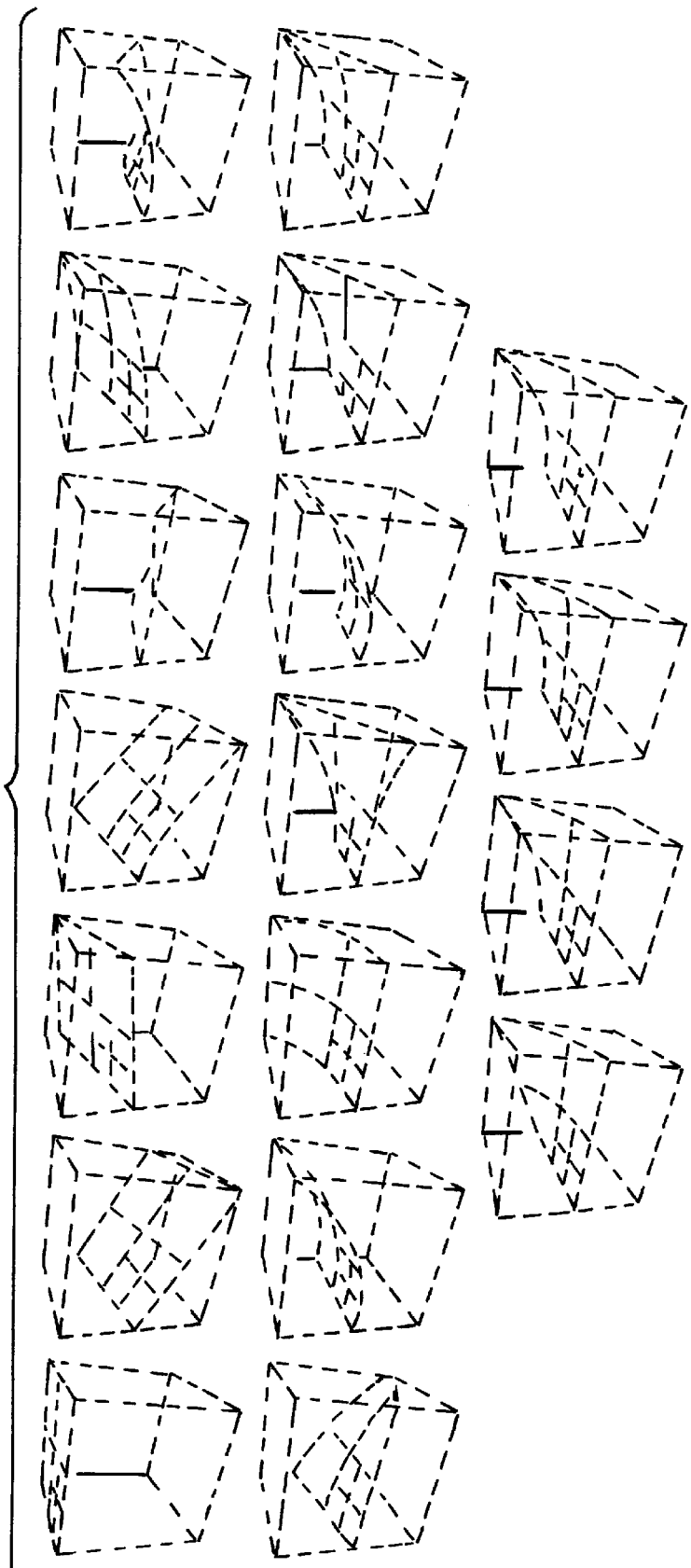
FIG. 12 are pictures illustrating eigenbasis functions for extraordinary vertices having a valence of N=5.

Referring to FIGS. 11 and 12, complete sets of eigenbasis functions for valences three and five is shown. Each function has been normalized such that its range is bounded within −1 and 1. In particular, the first eigenbasis corresponding to an eigenvalue of one is always a constant function for any valence. A closer look at FIGS. 11 and 12 reveals that they share seven identical functions. In fact as shown in Appendix B, the last seven eigenbasis functions for any valence are always equal to:

$$\{1/36u^3v^3, 1/6u^3, 1/6v^3v, 1/2u^3v^2, 1/6u^3, 1/6uv^3, 1/2u^2v^3\}.$$

Furthermore, transforming these functions back from the eigenspace using $W_1^{-1}$ produces seven B-spline basis functions $$b_4(u, v), b_8(u, v), b_{12}(u, v), \ldots, b_{16}(u, v),$$

i.e., the basis functions corresponding to the control vertices of FIG. 8B that did not neighbor the extraordinary vertex.

In the regular bi-cubic B-spline case (N=4), the remaining eigenbasis can be chosen to be equal to the power basis:

$$\{1, u, v, u^2, uv, v^2, u^2v, uv^2, u^2v^2\}$$

The power basis has a scaling property. For example, the basis function $u^2v$ corresponds to the eigenvalue ⅛:

$$(u/2)^2(v/2) = (1/2)^2(1/2)u^2v = \tfrac{1}{8}u^2v.$$

Thus, a relationship exists between Catmull-Clark subdivision and the power basis in the regular case (that is, without an extraordinary vertex). Further, the eigenvectors in this case correspond to the "change of basis matrix" from the bi-cubic B-spline basis to the power basis. The eigenbasis functions at extraordinary vertices can thus be interpreted as a generalization of the power basis. However, the eigenbases are in general not polynomials. In the case of Catmull-Clark subdivision, the eigenbases are piece-wise bi-cubic polynomials. The evaluation of the surface patch given by equation (15) can now be rewritten exactly as:

$$s(u, v) = \sum_{i=1}^{K} \varphi_i(u, v) p_i. \tag{16}$$

This equation gives a parameterization for the surface corresponding to any face of the control vertice mesh, regardless of the valence of a vertex. Further, there is no need to explicitly subdivide. Equation (16) also permits computation of derivatives of the surface up to any order. Only the corresponding derivatives of the basis functions appearing in equation (16) are required. For example, the partial derivative of the i-th eigenbasis with respect to u $$\frac{\partial}{\partial u}\varphi_i(u, v)\bigg|\Omega_k^n = 2^n(\lambda_i)^{n-1}\frac{\partial}{\partial u}x_i(t_{k,n}(u, v), k),$$

where the factor $2^n$ is equal to the derivative of the affine transformation $t_{k,n}$. Generally a factor $2^{pn}$ will be present when the order of differentiation is p.

Although the derivation of the evaluation technique is mathematically involved, its implementation is straightforward. The task of computing the eigenstructure of the subdivision matrix only has to be performed once and is provided in Appendix A. In practice, it is useful to precompute these eigenstructures up to some maximum valence (e.g., NMAX=500) and store the computed values in a file. The eigenstructure values for valences of three and five are included in Appendix E. Any program using the evaluation technique can read in these precomputed eigenstructures. In one implementation the eigenstructure for each valence N is stored as:

```
typedef
    struct {
        double L[K];           /* eigenvalues */
        double iV[K] [K];      /* inv of the eigenvectors */
        double x[K] [3] [16];  /* coeffs of the splines */
    } EIGENSTRUCT;
EIGENSTRUCT eigen[NMAX];
``` where K=2*N+8. Computing the values of this array of structures need only be done once, hence, its computational cost is essentially irrelevant to the efficiency of the evaluation scheme.

After reading in precomputed values for eigenstructures from a file, computer-assisted evaluation of a surface patch around an extraordinary vertex can proceed. First, the control vertices surrounding the patch are projected into the eigenspace of the subdivision matrix. The control vertices are ordered as shown in FIG. 8B and stored in an array C[K]. The projected vertices Cp[K] are then easily computed by using the precomputed inverse of the eigenvectors:

```
ProjectPoints(point *Cp,point *C,int N) {
    for ( i=0 ; i<2*N+8 ; i++ ) {
        Cp[i] = (0,0,0);
        for ( j=0 ; j<2*N+8 ; j++ ) {
            Cp[i] += eigen[N].iV[i][j] * C[j];
        }
    }
}
```

ProjectPoints need only be called when one of the patches is evaluated for the first time or after an update of the mesh. ProjectPoints is, therefore, called at most once per surface patch.

EvalSurf is a straightforward implementation of the sum appearing in equation (15) and includes computation of the domain n holding a location. EvalSurf is called whenever the surface has to be evaluated at a particular parameter value (u,v). The following routine computes the surface patch at any parameter value.

```
EvalSurf ( point P, double u, double v, point *Cp, int N )
{
    /* determine in which domain Ω_n the parameter lies */
    n = floor(min(-log2(u),-log2 (v)));
    pow2 = pow(2,n-1);
    u *= pow2; v *= pow2;
    if ( v < 0.5 ) {
        k=0; u=2*u-1; v=2*v;
    }
    else if ( u < 0.5 ) {
        k=2; u=2*u; v=2*v-1;
    }
    else {
        k=1; u=2*u-1; v=2*v-1;
    }
    /* Now evaluate the surface */
    P = (0,0,0);
    for ( i=0 ; i<2*N+8 ; i++ ) {
        P += pow(eigen[N].L[i],n-1) *
            EvalSpline(eigen[N].x[i][k],u,v)*Cp[i];
    }
}
```

EvalSpline computes the bi-cubic polynomial whose coefficients are given by its first argument at the parameter value (u, v). A sample implementation of EvalSpline follows:

```
EvalSpline ( double*C, double u, double v ) {double s0, s1, s2, s3;
    s0=C[0]+u*(C[1]+u*(C[2]+u*C[3]));
    s1=C[4]+u*(C[5]+u*(C[6]+u*C[7]));
    s2=C[8]+u*(C[9]+u*(C[10]+u*C[11]));
    s3=C[12]+u*(C[13]+u*(C[14]+u*C[15]));
    return (s0+v*(s1+v*(s2+v*s3)) );
}
```

When either one of the parameter values u or v is zero, the value is incremented to a sufficiently small value near the precision of the machine, to avoid an overflow that would be caused by the log 2 function. Because EvalSpline evaluates a bi-cubic polynomial, the cost of EvalSurf is comparable to that of a bi-cubic surface spline. The extra cost due to the logarithm and the elevation to an integer power is minimal, because these operations are efficiently implemented on most current computer hardware. Since the projection step is only called when the mesh is updated, the cost of evaluation depends predominantly on EvalSurf.

The computation of the p-th derivative is entirely analogous. Instead of using the routine EvalSpline, a routine is used that returns the p-th derivative of the bi-cubic polynomial. In addition, the final result is scaled by a factor pow(2,n*p). The evaluation of derivatives is essential in applications that require precise surface normals and curvature. For example, Newton iteration schemes used in ray surface computations require higher derivatives of the surface at arbitrary parameter values.

As discussed, the eigenstructure of the subdivision matrix need only be performed once for a given set of valences. Hence, accuracy is more important than efficiency in this instance. As shown in Appendix A, the eigenstructure of the two matrices S and $S_{12}$ can be computed analytically. The corresponding eigenstructure of the extended subdivision matrix A requires solution of equation (11)'s 2N+1 linear systems. These systems can be solved up to machine accuracy using standard linear solvers, such as a dgesv routine from LINPACK. The inverse of the eigenvectors may be computed by carrying out the matrix products appearing in Equation (12). Using the eigenvectors, the coefficients of the bi-cubic splines x(u, v, k) can be precomputed as explained in Appendix B. For each valence N, date in data structure eigen[NMAX] is saved in a file to be read in at the start of any application which uses the routines ProjectPoints and EvalSurf.

Figure 13:
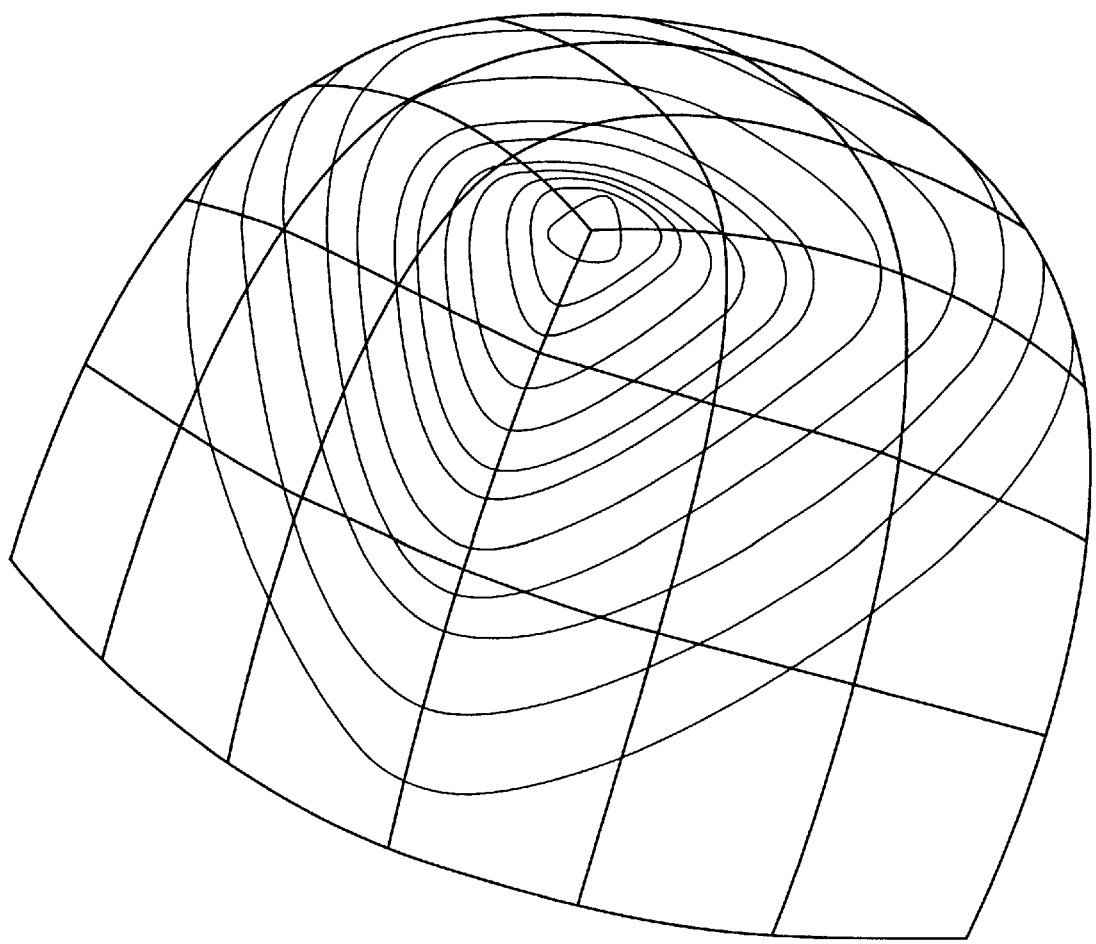
FIG. 13 is a picture of a simple surface produced by evaluation using the eigenbasis functions.
Figure 14:
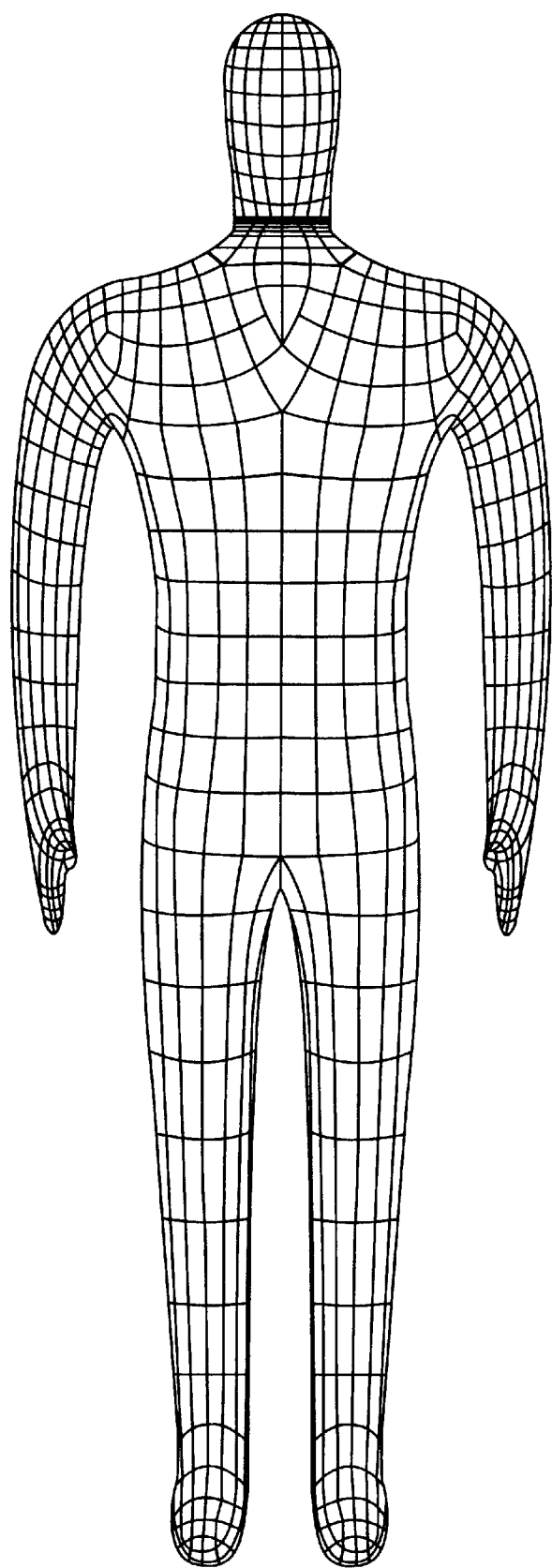
FIG. 14 is a picture of a complex surface produced by evaluation using the eigenbasis functions.

Referring to FIG. 13, a Catmull-Clark subdivision surfaces is shown. An extraordinary vertex is located in the center of the surface. The position information within the patches surrounding the extraordinary vertex are computed using the evaluation technique. The remaining patches are evaluated as bi-cubic B-splines. The curvature varies smoothly across the boundary between the patches evaluated using our technique and the regular bi-cubic B-spline patches. FIG. 14 depicts a more complex surface.

The technique described above can be applied to a variety of subdivision rules as long as such rules admit parameterization of regular patches. For example, analysis of Loop subdivision rules which handle subdivision of control vertices that control triangular patches similarly evaluates a surface without explicit subdivision.

Figure 15:
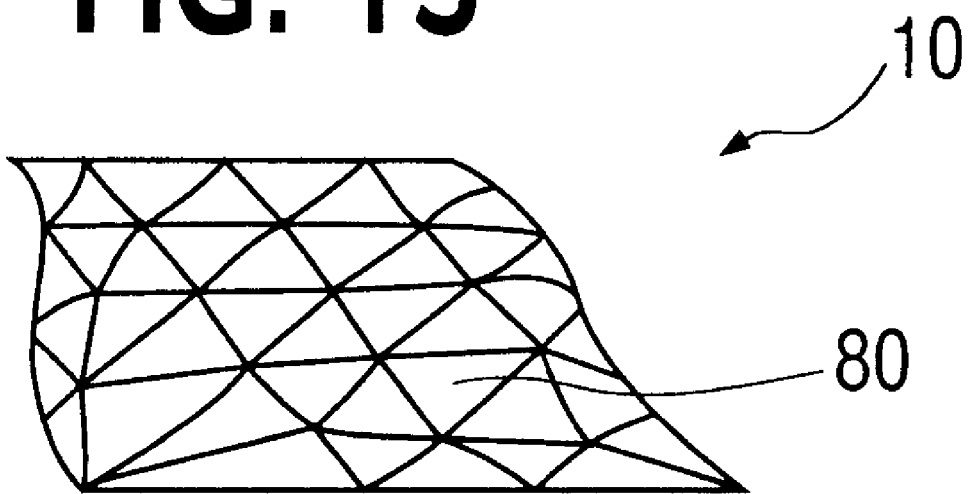
FIG. 15 is a diagram illustrating division of a surface into triangular patches.
Figure 16:
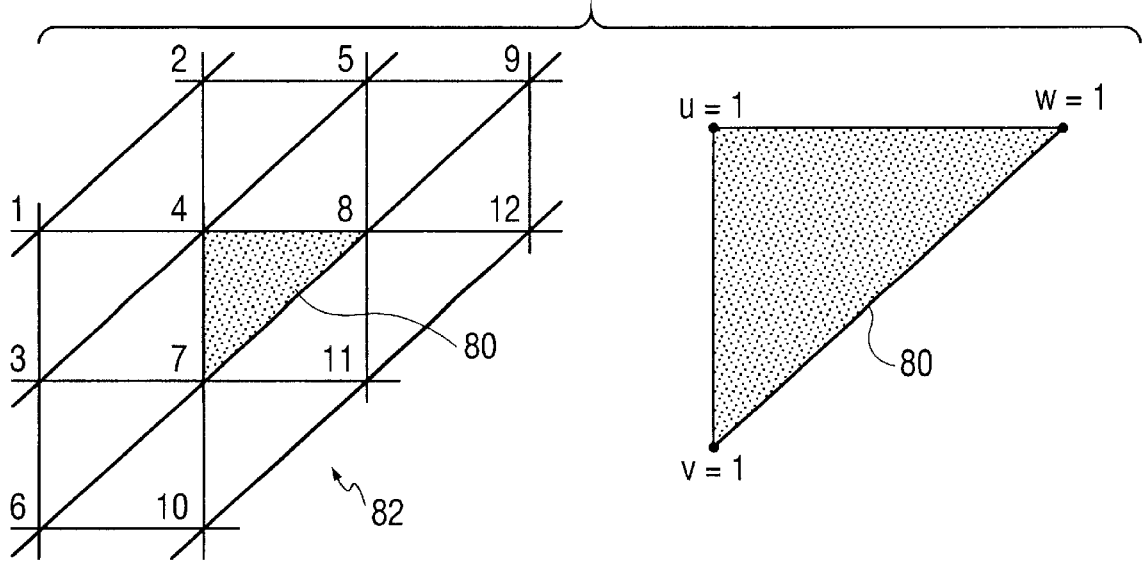
FIG. 16 is a diagram illustrating control vertices that control the contour of a triangular surface patch.

Referring to FIG. 15, a free-form surface 10 can be thought of as being covered by a set of connected triangular patches such as patch 80. Referring to FIG. 16, a set of twelve control vertices 82 control the contour of triangular patch 80. Each control vertex of a regular triangular patch has a valence of six. As shown in FIG. 16, the control vertices that control regular patch 80 each have valence of six. The triangular patch can be parameterized using known basis functions for triangular Bezier patches derived from the box splines. The basis functions corresponding to each of the control vertices are given in Appendix D.

Figure 17:
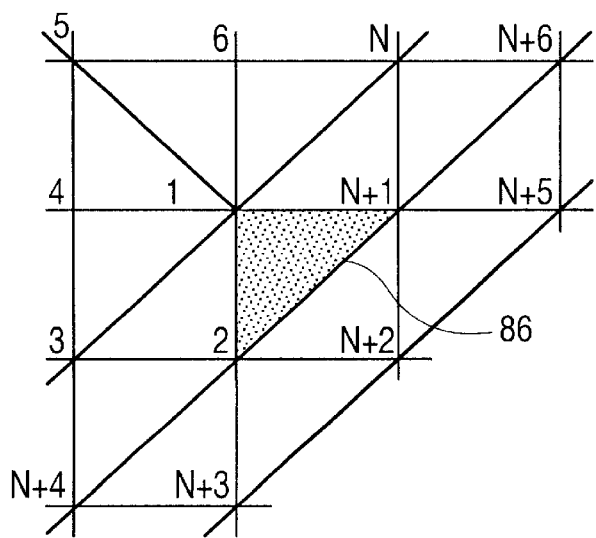
FIG. 17 is a diagram illustrating an irregular set of control vertices having an extraordinary control vertex.

Referring to FIG. 17, for triangular patches, unlike quadrilateral patches, a regular control vertex has a valence of N=6. Control vertex 84, shown in FIG. 17, is an extraordinary vertex having a valence of N=7. Hence, triangular patch 86 does not admit an ordinary parameterization. Loop subdivision rules, however, can be used to subdivide control vertices that control triangular patches. Matrix representation of Loop subdivision rules produces different eigenstructures than Catmull-Clark subdivision rules, however, the approach and ultimate implementation differ only in the values derived.

As described in conjunction with Catmull-Clark subdivision rules, the techniques of the present invention obviate the need for explicit subdivision. Mathematical analysis of the subdivision rules, however, is used to describe the techniques.

Referring again to FIG. 16, a regular triangular patch 80 can be denoted compactly as:

$$s(v, w) = C^T b(v, w), (v, w) \in \Omega,$$

where C is a 12×3 matrix containing the control vertices of the patch ordered as in FIG. 16 and b(u,w) is the vector of basis functions (see Appendix D). The surface is defined over the "unit triangle":

$$\Omega = \{(v, w) | v \in [0,1] \text{ and } w \in [0, 1-v]\}.$$

The parameter domain is a subset of the plane such that v=1 corresponds to the point (1,0) and w=1 corresponds to the point (0,1). A third parameter u=1 is derived such that (u, v,w) forms a barycentric system of coordinates for the unit triangle. The value u corresponds to the origin (0,0). The degree of the basis function is at most four in each parameter, hence, the surface patch forms a quartic spline.

Referring again to FIG. 17, a triangular patch 86 is controlled by a set of K=N+6 control vertices that includes an extraordinary vertex 84. The extraordinary vertex corresponds to the parameter value u=1. Since the valence of the extraordinary vertex in the middle of the figure is N=7, there are K=13 control vertices in this case. The figure also provides the ordering of the control vertices. The initial K control vertices are stored in a K×3 matrix:

$$C_0^T = (c_{0,1}, \ldots, c_{0,K}).$$

Figure 18:
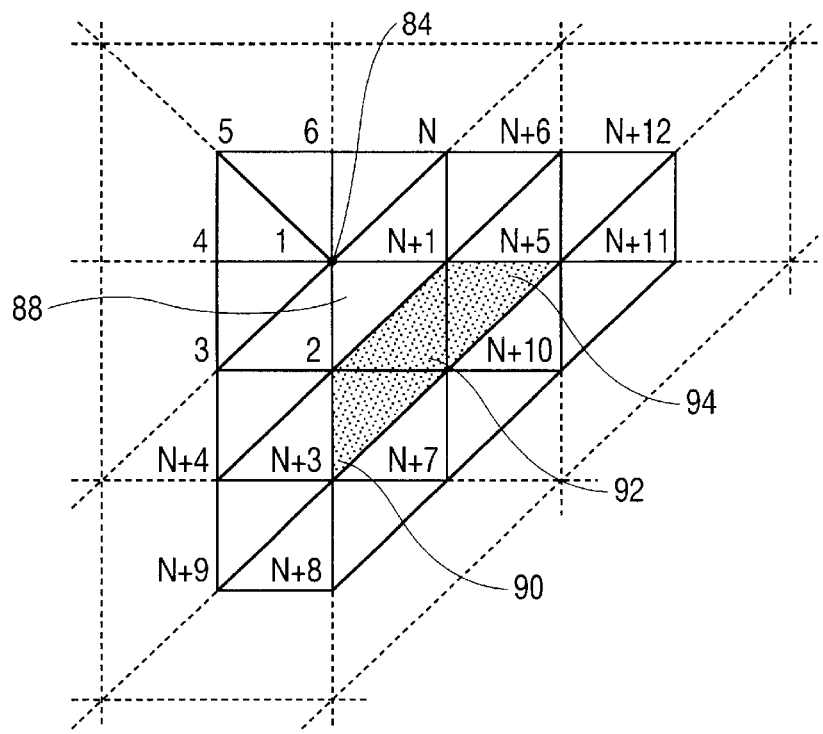
FIG. 18 is a diagram illustrating application of Loop subdivision rules to a set of control vertices having an extraordinary control vertex.

Referring to FIG. 18, application of Loop subdivision rules produces a new set of M=K+6=N+12 control vertices. This produces enough control vertices to evaluate three-quarters of the triangular patch. The new set of control vertices are denoted by:

$$C_1^T = (c_{1,1}, \ldots, c_{1,K})$$

and $$\bar{C}_1^T = (c_{1,1}, \ldots, c_{1,K}, c_{1,K+1}, \ldots, c_{1,M}).$$

$C_{1,1}$ to $C_{1,K}$ correspond to control vertices still neighboring the extraordinary vertex 84 after subdivision, while $C_{1,K+1}$ to $C_{1,M}$ correspond to those control vertices produced by subdivision that do not neighbor the extraordinary vertex 84. Loop subdivision rules can by represented by multiplication by a K×K extended subdivision matrix A:

$$C_1 = AC_0,$$

where $$A = \begin{pmatrix} S & 0 \\ S_{11} & S_{12} \end{pmatrix},$$

Appendix C includes definitions of matrix A. The additional vertices needed to evaluate the surface are obtained from a bigger subdivision matrix $\bar{A}$:

$$\bar{C}_1 = \bar{A}C_0,$$

where $$\bar{A} = \begin{pmatrix} S & 0 \\ S_{11} & S_{12} \\ S_{21} & S_{22} \end{pmatrix},$$

Appendix E also includes definitions of $S_{21}$ and $S_{22}$.

Figure 19:
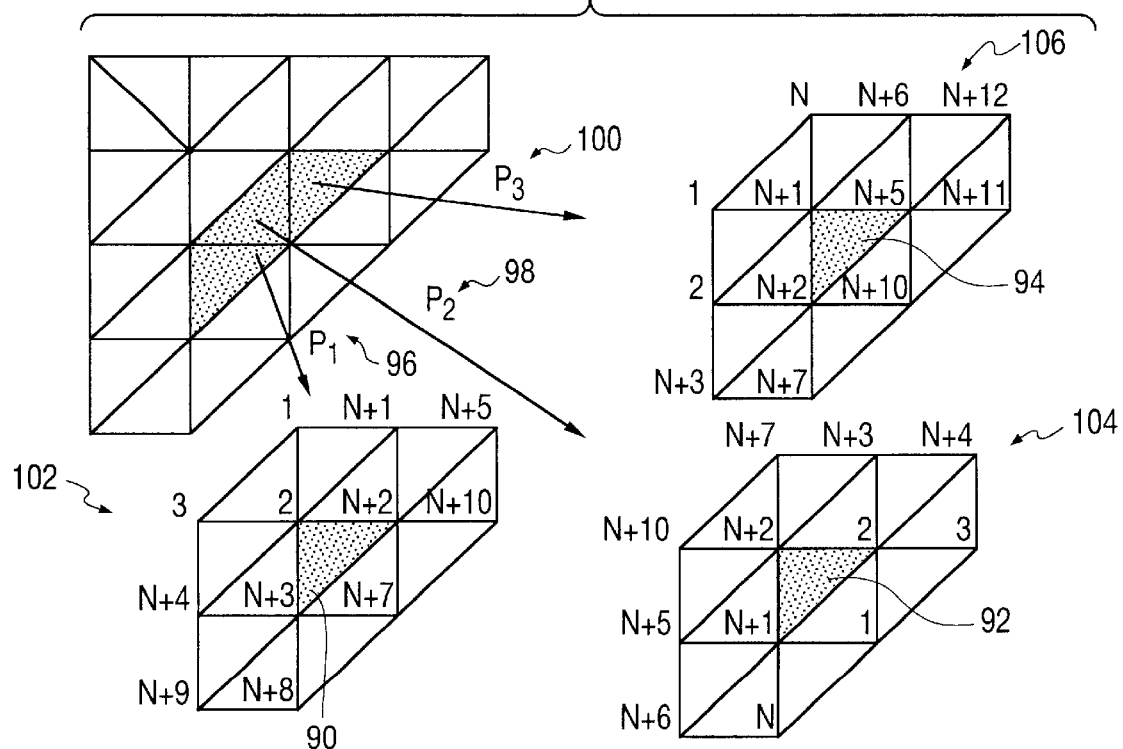
FIG. 19 is a diagram illustrating how subdivision produces a set of regular surface patches.

Referring to FIG. 19, three subsets of twelve control vertices from $\bar{C}_1$ define three regular triangular patches 90, 92, and 94 which can be readily evaluated. Repeated application of the Loop subdivision rules can generate an infinite sequence of control vertices:

$$\bar{C}_n = \bar{A}C_{n-1} = \bar{A}A^{n-1}C_0, \; n \geq 1.$$

For each $n \geq 1$, a subset of control vertices 102, 104, 106 form the control vertices of regular triangular patches 90, 92, 94. These three sets of control vertices 102, 104, 106 are denoted by the following three 12×3 matrices $B_{n,k}$, with k=1,2,3. Picking matrices P 96, 98, 100 of size 12×M select these control vertices from the control vertices produced by subdivision. Hence, $$B_{n,k} = P_k \bar{C}_n, \; k=1,2,3.$$

Each row of each picking matrix P is filled with zeros except for a one in the column corresponding to the index. Each surface patch is then defined as follows:

$$s_{n,k}(v, w) = B_{n,k}^T b(v, w) = \bar{C}_n^T P_K^T b(v, w).$$

Figure 20:
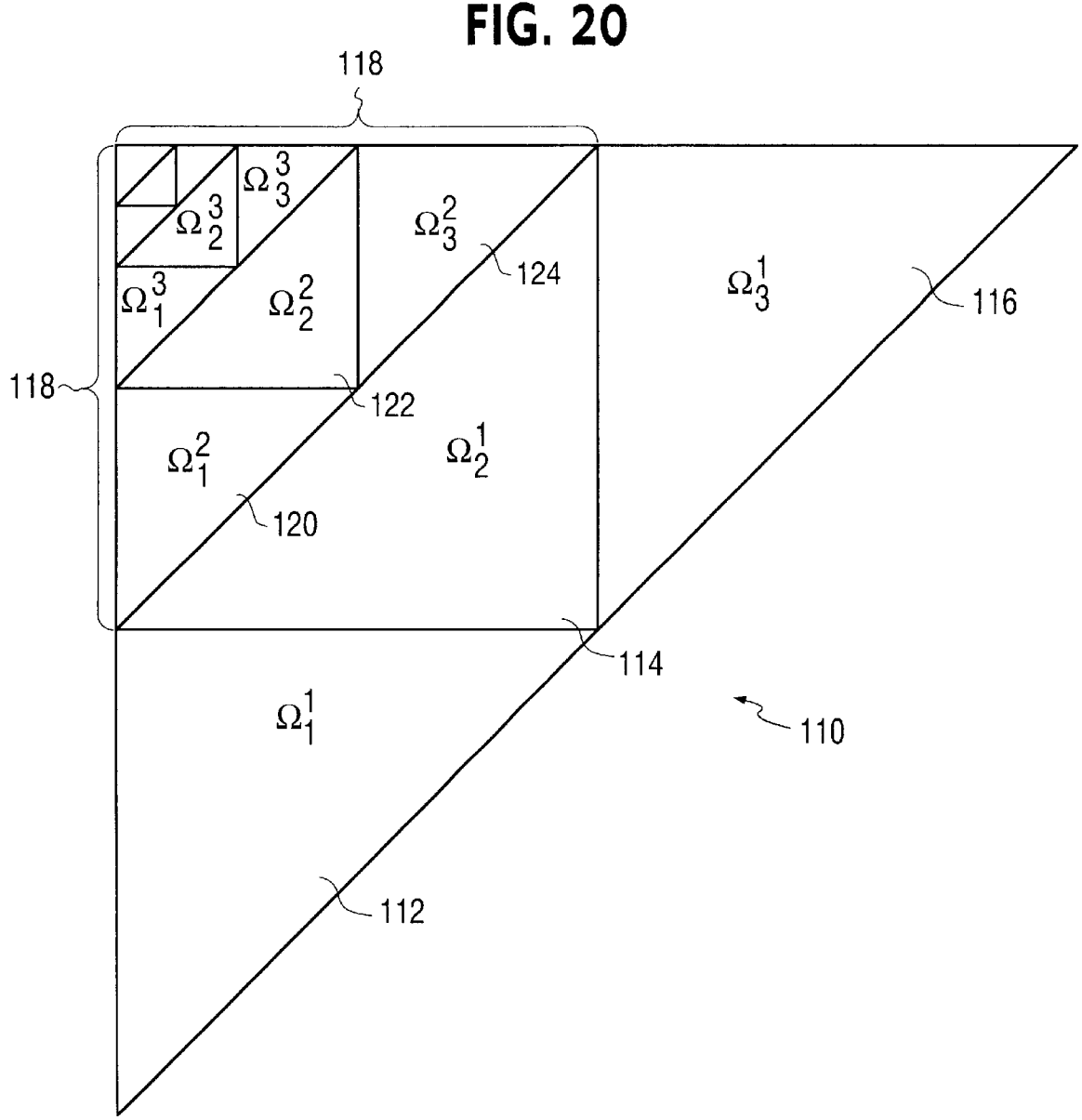
FIG. 20 is a diagram illustrating a hierarchically nested set of tiles that form a unit domain.

Referring to FIG. 20, a patch can be partitioned into an infinite set of hierarchically nested tiles $\Omega^n_k$, with $n \geq 1$ and k=1,2,3. The size of these tiles are defined more precisely as:

$$\Omega_1^n = \{(v, w) | v \in [2^{-n}, 2^{-n+1}] \text{ and } w \in [0, 2^{-n+1}-v]\}$$

$$\Omega_2^n = \{(v, w) | v \in [0, 2^{-n}] \text{ and } w \in [0, v]\}$$

$$\Omega_3^n = \{(v, w) | v \in [0, 2^{-n}] \text{ and } w \in [2^{-n}, 2^{-n+1}-v]\}.$$

The surface patch is then defined by its restriction to each of these triangles:

$$s(v, w) | \Omega_k^n = s_{n,k}(t_{n,k}(v,w)) = C_0^T (P_k \bar{A} A^{n-1})^T b(t_{n,k}(v, w)),$$

where a transformation $t_{n,k}$ maps the tile $\Omega^n_k$ onto the unit tile $\Omega$:

$$t_{n,1}(v, w) = (2^n v - 1, 2^n w),$$

$$t_{n,2}(v, w) = (1 - 2^n v, 1 - 2^n w)$$

and $$t_{n,3}(v, w) = (2^n v, 2^n w - 1).$$

This equation defines a parameterization for the surface patch. However the equation is computationally expensive to evaluate since it involves taking powers of a matrix to any number $n \geq 1$. Analyzing the eigenstructure can make the parameterization more efficient.

For any valence N, the extended subdivision matrix A is non-defective. Consequently, A can be diagonalized and:

$$A = V \Lambda V^{-1},$$

where $\Lambda$ is the diagonal matrix which contains the eigenvalues and V contains the eigenvectors. These matrices have the following block structure:

$$\Lambda = \begin{pmatrix} \Sigma & 0 \\ 0 & \Delta \end{pmatrix} \text{ and } V = \begin{pmatrix} U_0 & 0 \\ U_1 & W_1 \end{pmatrix}.$$

The diagonal blocks $\Sigma$ and $\Delta$ correspond to the eigenvalues of S and $S_{12}$, respectively, and their corresponding eigenvectors are stored in $U_0$ and $W_1$, respectively. The matrix $U_1$ is computed by extending the eigenvectors of S, i.e., by solving the following linear systems:

$$U_1 \Sigma - S_{12} U_1 = S_{11} U_0.$$

Appendix C illustrates computation of the entire eigenstructure for Loop's scheme precisely. Denoting $\hat{C}_0 = V^{-1} C_0$ as the projection of the initial control vertices onto the eigenspace of A and $\Phi(v,w)$ as a K-dimensional vector of eigenbasis functions defined by:

$$\Phi(v, w) | \Omega_k^n = \Lambda^{n-1} (P_k \bar{A} V)^T b(t_{n,k}(v, w)) \; n \geq 1 \text{ and } k=1,2,3.$$

Figure 21:
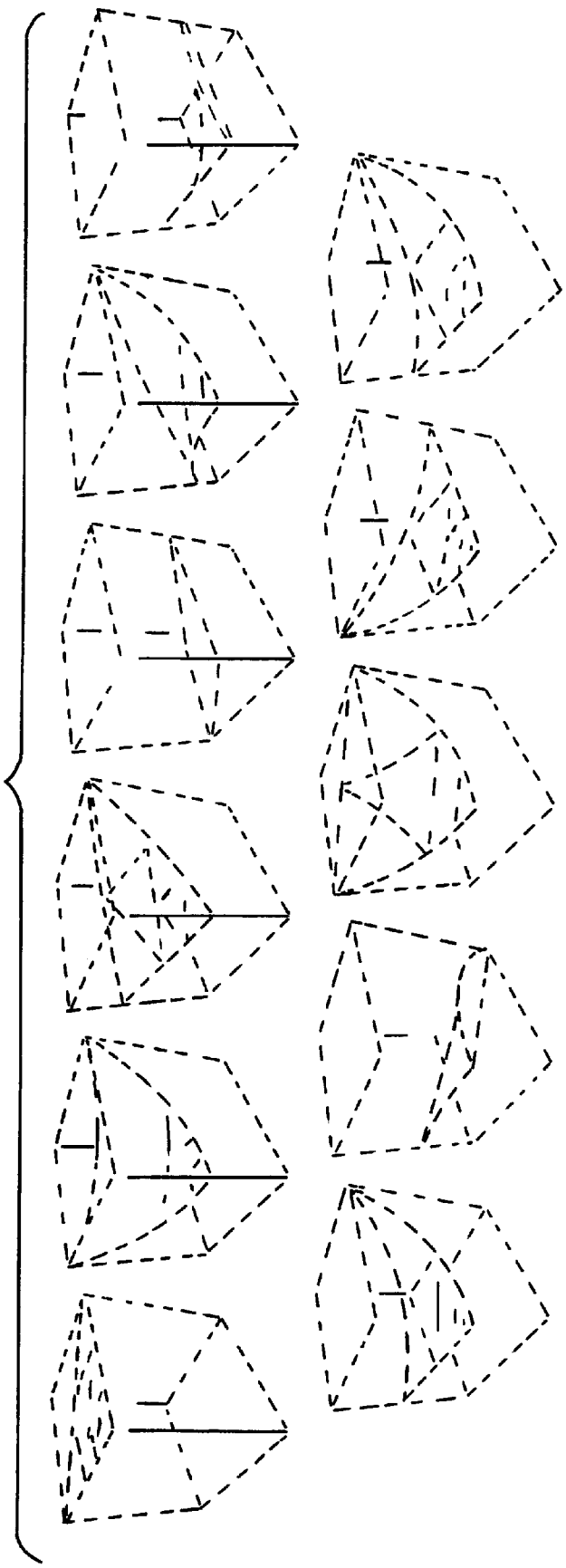
FIG. 21 are pictures illustrating eigenbasis functions for extraordinary vertices having a valence of N=5.
Figure 22:
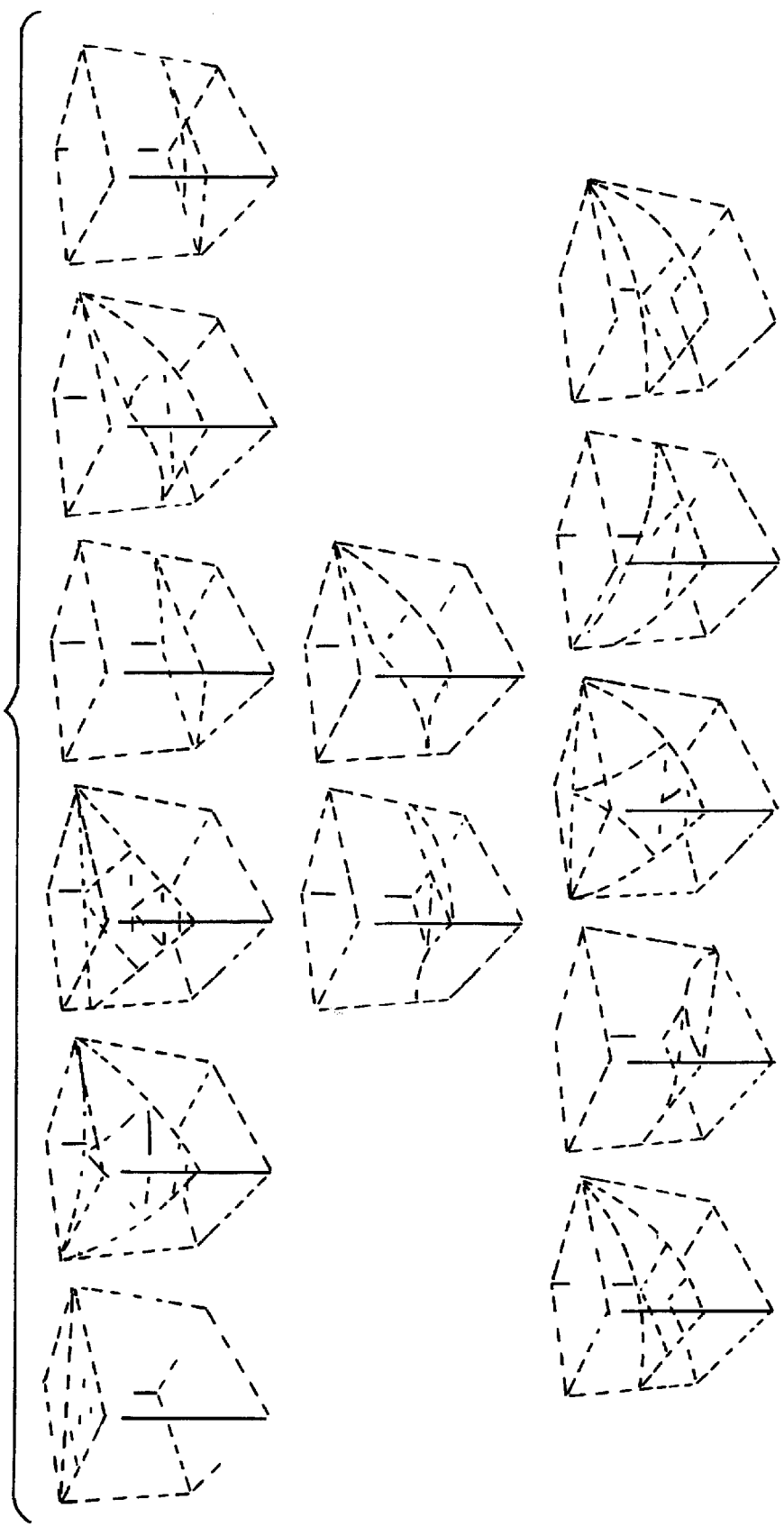
FIG. 22 are pictures illustrating eigenbasis functions for extraordinary vertices having a valence of N=7.
Figure 23:
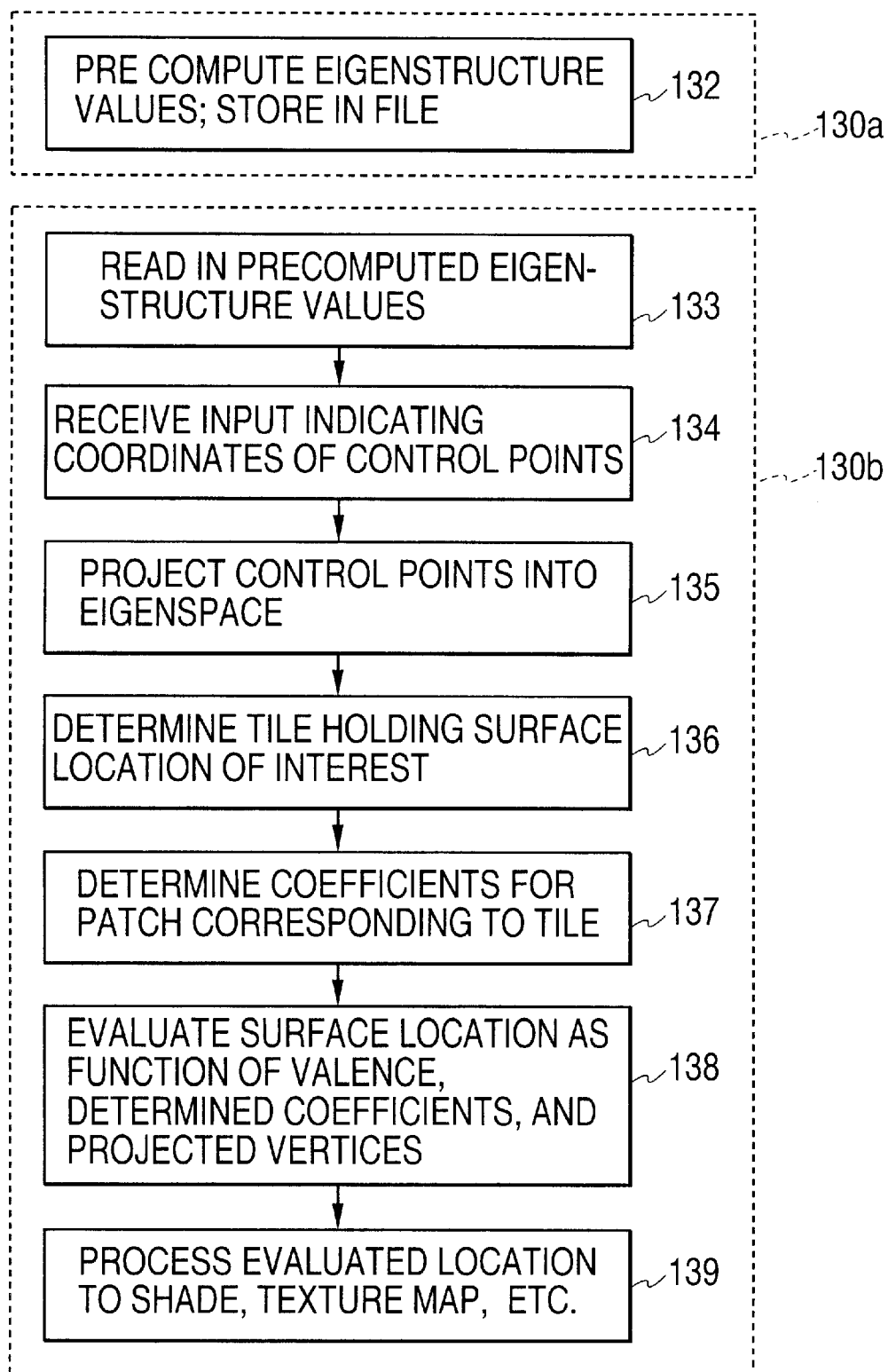
FIG. 23 is a flowchart illustrating evaluation of a surface location.
Figure 24:
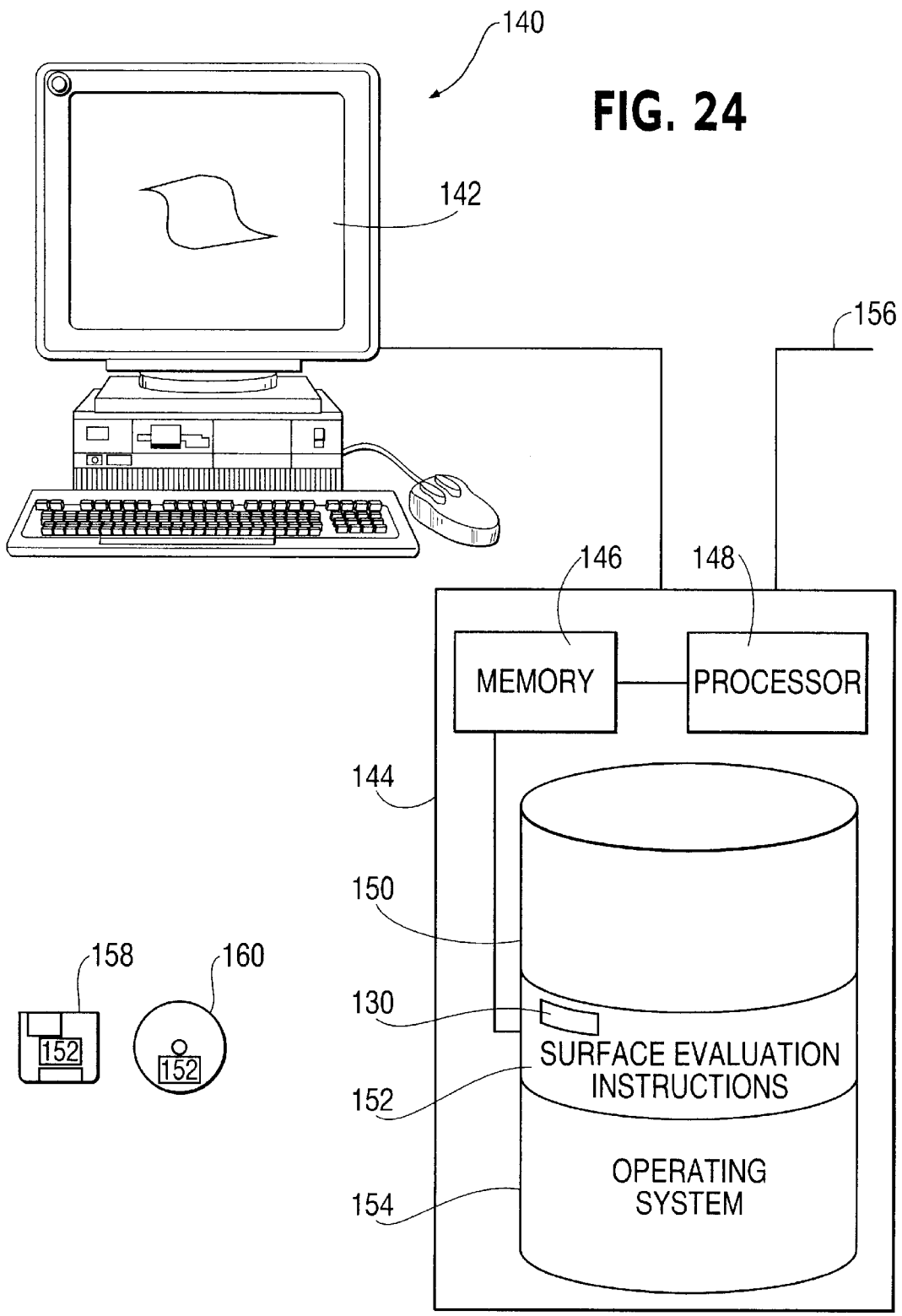
FIG. 24 is a diagram of a computer platform.

The eigenbasis functions for valences N=5 and N=7 are depicted in FIGS. 21 and 22. Each function of the eigenbasis corresponds to one of the eigenvectors of the matrix A. Each eigenbasis function is entirely defined by its restriction on the unit triangles $\Omega_1^1$, $\Omega_2^1$ and $\Omega_3^1$. On each of these domains the eigenbasis is a quartic spline. The basis functions can be evaluated elsewhere since they satisfy the following scaling relation:

$$\Phi(v/2, w/2) = \Lambda \Phi(v, w).$$

The triangular surface patch can now be written solely in terms of the eigenbasis:

$$s(v, w) = \hat{C}_0^T \Phi(v, w).$$

The eigenstructures of the subdivision matrices for a meaningful range of valences need only be computed once. Let NMAX be the maximum valence, then each eigenstructure is stored internally in the following data structure:

```
typedef
    struct {
        double L[K];            /* eigenvalues */
        double iV[K] [K];       /* inverse of the eigenvectors */
        double Phi[K][3][12];   /* Coefficients of eigenbasis */
} EIGENSTRUCT;
EIGENSTRUCT eigen[NMAX];
``` where K=N+6. The coefficients of the eigenbasis functions are given in the basis functions shown in Appendix D. There are three sets of control vertices, one for each fundamental domain of the eigenbasis. These control vertices are simply equal to $P_k \overline{A} V$. The eigenstructure was computed from the results of Appendix C and by solving the linear system defined above numerically. Using this eigenstructure the surface for any patch can be evaluated by first projecting the K control vertices defining the patch into the eigenspace of the subdivision matrix with the following routine.

```
ProjectPoints ( points *Cp, point *C, int N ) {
    for ( i=0 ; i<N+6 ; i++ ){
        Cp[i]=(0,0,0);
        for ( j=0 ; j<N+6 ; j++ ){
            Cp[i] += eigen[N].iV[i][j] * C[j];
        }
    }
}
```

This routine need be called only once for a particular set of control vertices. The evaluation at a parameter value (v,w) is performed by computing the product given by the eigenbasis functions.

```
EvalSurf ( point P, double v, double w, point *Cp, int N ) {
    /* determine in which domain Ωₙ the parameter lies */
    n = floor(min(-log2(v),-log2(w)));
    pow2 = pow(2,n-1);
    v *= pow2; w *= pow2;
    if ( v > 0.5 ) {
        k=0; v=2*v-1; w=2*w;
    }
    else if ( w > 0.5 ) {
        k=2; v=2*v; w=2*w-1;
    }
    else {
        k=1; v=1-2*v; w=1-2*w;
    }
    /* Now evaluate the surface */
    P = (0,0,0);
    for ( i=0 ; i<N+6 ; i++ ) {
        P += pow(eigen[N].L[i],n-1) *
             EvalBasis(eigen[N].Phi[i][k],v,w) * Cp[i];
    }
}
```

The routine EvalBasis evaluates a regular triangular patch using the basis of Appendix D. To evaluate higher order derivatives, EvalBasis can be replaced with a function that evaluates a derivative of the basis. In this case, the end result also must be multiplied by two to the power n*p, where p is the order of differentiation. Therefore, the following line should be added at the end of EvalSurf:

P=k==1 ? pow(-2,n*p)*P : pow(2,n*p)*P.

Hence, though Catmull-Clark and Loop subdivision rules handle different patch shapes, both can be processed in similar ways. In fact, as long as the subdivision rules admit parameterization of regular control vertices, the techniques described herein can be used.

Catmull-Clark surfaces and Loop surfaces share the property that their extended subdivision matrices are non-defective. In general, this is not the case. For example, the extended subdivision matrix of Doo-Sabin surfaces cannot generally be diagonalized. However, the techniques described herein do not require non-defective matrices. For example, Doo-Sabin surfaces could use a Jordan normal form (see C. G. Cullen, "Matrices and Linear Transformations", Dover, N.Y., 1990) of the extended subdivision matrix in conjunction with general scaling relations shown in Zorin (D. N. Zorin, "Subdivision and Multiresolution Surface Representations", PhD thesis, California Institute of Technology, Pasadena, Calif., 1997).

Referring to FIG. 25, both sample embodiments described proceed in the same manner (130). Prior to evaluation of any surface locations, eigenstructures (e.g., eigenvalues, an inverse eigenvector matrix, and coefficients for basis functions corresponding to regular regions) are computed and stored (132) in file. Thereafter, to evaluate a surface, the stored data is retrieved (133) and the coordinates of the control vertices is determined (134) either via a graphical user interface or as specified in program variables. The control vertices are projected (135) into an eigenspace using the precomputed inverse eigenvector matrix. After determining which of the hierarchically nested tiles (136) holds the surface location of interest, basis coefficients of the tile can be determined (137) from the precomputed data. The location can then be evaluated (138) as a function of the valence of an extraordinary vertex, the determined basis coefficients, and the projected control vertices. This evaluation can be a determination of three-dimensional coordinates or a determination of a derivative (e.g., a normal or curvature) of the surface at the specified location. As mentioned, the derivative can be of any order. The results of evaluation can optionally be fed (139) into other routines that shade, texture map, or perform other surface processing functions.

Referring to FIG. 26, the evaluation described above may be embodied in a computer platform 140 suitable for executing instructions. The computer platform 140 includes a monitor 142 connected to a computer system 144. The computer system 142 can control the monitor to display surface models. The platform 140 includes a pointing device, such as a mouse, to enable a user to interact with a graphical user interface and adjust control vertices.

The computer system 142 includes a mass storage device 150 (e.g., a hard disk drive, CD-ROM, floppy disk), memory 146, and a processor 148. Instructions are transferred from the mass storage device 150 to memory 146 and the processor 148 in the course of operation. Resident on the mass storage device 150 are software instructions 152 for evaluating a surface in accordance with the invention, including, e.g., precomputed stored information such as the described eigenstructures. The computer platform 140 may include a network connection 156. Though described herein as being implemented in software, the invention can be implemented in either hardware or software or a combination of both.

APPENDIX A

Subdivision Matrices for Catmull-Clark Subdivision Rules and Their Eigenstructures Matrix S corresponds to the extraordinary rules around the extraordinary vertex. Ordering control vertices as shown in FIG. 8B, the matrix S is:

$$S = \begin{pmatrix} a_N & b_N & c_N & b_N & c_N & b_N & \cdots & b_N & c_N & b_N & c_N \\ d & d & e & e & 0 & 0 & \cdots & 0 & 0 & e & e \\ f & f & f & f & 0 & 0 & \cdots & 0 & 0 & 0 & 0 \\ d & e & e & d & e & e & \cdots & 0 & 0 & 0 & 0 \\ f & 0 & 0 & f & f & f & \cdots & 0 & 0 & 0 & 0 \\ \vdots & & & \vdots & & & \ddots & & & \vdots & \\ d & e & 0 & 0 & 0 & 0 & \cdots & e & e & d & e \\ f & f & 0 & 0 & 0 & 0 & \cdots & 0 & 0 & f & f \end{pmatrix}$$

where $$a_N = 1 - \frac{7}{4N},\ b_N = \frac{3}{2N^2},\ c_N = \frac{1}{4N^2},\ d = \frac{3}{8},\ e = \frac{1}{16},\ f = \frac{1}{4}.$$

The lower right 2N×2N block of S has a cyclical structure, thus, the discrete Fourier transform can compute the eigenstructure of S. The discrete Fourier transform can be written compactly by introducing the following 2N×2N Fourier matrix:

$$F = \begin{pmatrix} 1 & 0 & 1 & 0 & \cdots & 1 & 0 \\ 0 & 1 & 0 & 1 & \cdots & 0 & 1 \\ 1 & 0 & \omega^{-1} & 0 & \cdots & \omega^{-(N-1)} & 0 \\ 0 & 1 & 0 & \omega^{-1} & \cdots & 0 & \omega^{-(N-1)} \\ & & \vdots & & \ddots & \vdots & \\ 1 & 0 & \omega^{-(N-1)} & 0 & \cdots & \omega^{-(N-1)^2} & 0 \\ 0 & 1 & 0 & \omega^{-(N-1)} & \cdots & 0 & \omega^{-(N-1)^2} \end{pmatrix},$$

where $$\omega = \exp(i2\pi/N))$$

Using these notations we can write down the Fourier transform of the matrix S compactly as:

$$\hat{S} = \begin{pmatrix} \hat{S}_0 & 0 & 0 & 0 \\ 0 & \hat{S}_1 & 0 & 0 \\ \vdots & 0 & \ddots & 0 \\ 0 & 0 & 0 & \hat{S}_{N-1} \end{pmatrix} = TST^{-1},$$

where $$T = \begin{pmatrix} 1 & 0 \\ 0 & \frac{1}{N}F \end{pmatrix},\ T^{-1} = \begin{pmatrix} 1 & 0 \\ 0 & F^* \end{pmatrix},$$

$$\hat{S}_0 = \begin{pmatrix} a_N & Nb_N & Nc_N \\ d & 2f & 2e \\ f & 2f & f \end{pmatrix}\ \text{and}$$

$$\hat{S}_1 = \begin{pmatrix} e(\omega^{-1} + \omega^1) + d & e(1 + \omega^{-1}) \\ f(1 + \omega^1) & f \end{pmatrix},$$

$l = 1, \ldots, N-1$.

The eigenstructure of the Fourier transform $\hat{S}$ is computed from the eigenstructures of its diagonal blocks. The first block $\hat{S}_0$ has eigenvalues $$\mu_1 = 1,\ \mu_2, \mu_3 = \frac{1}{8N}\left(-7 + 3N \mp \sqrt{49 - 30N + 5N^2}\right)$$

and eigenvectors $$\hat{K}_0 = \begin{pmatrix} 1 & 16\mu_2^2 - 12\mu_2 + 1 & 16\mu_3^2 - 12\mu_3 + 1 \\ 1 & 6\mu_2 - 1 & 6\mu_3 - 1 \\ 1 & 4\mu_2 + 1 & 4\mu_3 - 1 \end{pmatrix}.$$

Similarly, the two eigenvalues of each block $\hat{S}_2(l=1, \ldots, N-1)$ are equal to:

$$\lambda_l^{\mp} = \frac{1}{16}\left(5 + \cos\left(\frac{2\pi l}{N}\right) \mp \cos\left(\frac{\pi l}{N}\right)\sqrt{18 + 2\cos\left(\frac{2\pi l}{N}\right)}\right),$$

where trigonometric relations simplify the resulting expressions. The corresponding eigenvectors of each block are:

$$\hat{K}_l = \begin{pmatrix} 4\lambda_l^- - 1 & 4\lambda_l^+ - 1 \\ 1 + \omega^l & 1 + \omega^l \end{pmatrix}.$$

A special case when N is even and l=N/2 must be singled out. For this case, the corresponding block is:

$$\hat{K}_{N/2} = \begin{pmatrix} 1 & 0 \\ 0 & 1 \end{pmatrix}.$$

The eigenvalues of the matrix $\hat{S}$ are the union of the eigenvalues of its blocks and the eigenvectors are:

$$\hat{K} = \begin{pmatrix} \hat{K}_0 & 0 & 0 & 0 \\ 0 & \hat{K}_1 & 0 & 0 \\ \vdots & 0 & \ddots & 0 \\ 0 & 0 & 0 & \hat{K}_{N-1} \end{pmatrix}.$$

Since subdivision matrix S and its Fourier transform $\hat{S}$ are similar, they have the same eigenvalues. The eigenvectors are computed by inverse Fourier transforming these eigenvectors:

$$K = T^{-1}\hat{K}.$$

Consequently, the eigenvalues and eigenvectors of S have been computed, however, in this form the eigenvectors are complex valued and most of the eigenvalues are actually of multiplicity two, since $\lambda_1^- = \lambda_{N-1}^+$ and $\lambda_1^+ = \lambda_{N-1}^-$. The eigenvalues can be relabeled as follows:

$$\mu_4 = \lambda_1^-,\ \mu_5 = \lambda_1^+,\ \mu_6 = \lambda_2^-,\ \mu_7 = \lambda_2^+, \ldots$$

Since the eigenvalues have been rearranged, the eigenvectors must also be rearranged. At the same time, these eigenvectors are made real. Let $k_1, \ldots, k_{2N+1}$ be the columns of K, then we can construct the columns of a matrix $U_0$ as follows:

$$u_1 = k_1, u_2 = k_2, u_3 = k_3,$$

$$u_{2l+2} = \tfrac{1}{2}(k_{l+3} + k_{2N-l+2})$$

and $$u_{2l+3} = \tfrac{1}{2}i(k_{l+3} - k_{2N-l+2}).$$

More precisely $u_1, u_2, u_3, u_{2l+2}, u_{2l+2},$ and $u_{2l+3}$ are equal to:

$$\begin{pmatrix} 1 \\ 1 \\ 1 \\ 1 \\ \vdots \\ 1 \\ 1 \end{pmatrix}, \begin{pmatrix} 16\mu_2^2 - 12\mu_2 + 1 \\ 6\mu_2 - 1 \\ 4\mu_2 + 1 \\ \vdots \\ 6\mu_2 - 1 \\ 4\mu_2 + 1 \end{pmatrix}, \begin{pmatrix} 16\mu_3^2 - 12\mu_3 + 1 \\ 6\mu_3 - 1 \\ 4\mu_3 + 1 \\ \vdots \\ 6\mu_3 - 1 \\ 4\mu_3 + 1 \end{pmatrix},$$

$$\begin{pmatrix} 0 \\ 4\mu_{2+3} - 1 \\ 1 + C_l \\ (4\mu_{l+3} - 1)C_l \\ C_l + C_{2l} \\ \vdots \\ (4\mu_{l+3} - 1)C_{(N-1)l} \\ C_{(N-1)l} + 1 \end{pmatrix} \text{ and } \begin{pmatrix} 0 \\ 0 \\ S_l \\ (4\mu_{l+3} - 1)S_l \\ S_l + S_{2l} \\ \vdots \\ (4\mu_{l+3} - 1)S_{(N-1)l} \\ S_{(N-1)l} \end{pmatrix},$$

respectively, where $l = 1, \ldots, N_2$, $N_2 = N-1$ when N is odd and $N_2 = N-2$ when N is even, and $$C_k = \cos\left(\frac{2\pi k}{N}\right) \text{ and } S_k = \sin\left(\frac{2\pi k}{N}\right).$$

When N is even the last two eigenvectors are:

$$u_{2N}^T = (0, 1, 0, -1, 0, 1, 0, \ldots, -1, 0)$$

and $$u_{2N+1}^T = (0, 0, 1, 0, -1, 0, 1, \ldots, 0, -1).$$

Finally, the diagonal matrix of eigenvalues is $$\Sigma = \text{diag}(1, \mu_2, \mu_3, \mu_4, \mu_4, \ldots, \mu_{N+2}, \mu_{N+2}).$$

The inverse of the eigenvectors $u_0$ can be computed likewise by first computing the inverses of each block $\hat{K}_l$ in the Fourier domain and then setting $$K^{-1} = \hat{K}^{-1} T.$$

With the same reshuffling as above $U_0^{-1}$ can be computed. The remaining blocks of the subdivision matrix A directly follow from the usual B-spline knot-insertion rules.

$$S_{12} = \begin{pmatrix} c & b & c & 0 & b & c & 0 \\ 0 & e & e & 0 & 0 & 0 & 0 \\ 0 & c & b & c & 0 & 0 & 0 \\ 0 & 0 & e & e & 0 & 0 & 0 \\ 0 & 0 & 0 & 0 & e & e & 0 \\ 0 & 0 & 0 & 0 & c & b & c \\ 0 & 0 & 0 & 0 & 0 & e & e \end{pmatrix}, S_{11} = \begin{pmatrix} c & 0 & 0 & b & a & b & 0 & 0 & 0 \\ e & 0 & 0 & e & d & d & 0 & 0 & 0 \\ b & 0 & 0 & c & b & a & b & c & 0 \\ e & 0 & 0 & 0 & 0 & d & d & e & 0 \\ e & 0 & 0 & d & d & e & 0 & 0 & 0 \\ b & c & b & a & b & c & 0 & 0 & 0 \\ e & e & d & d & 0 & 0 & 0 & 0 & 0 \end{pmatrix},$$

where $a = 9/16$, $b = 3/32$ and $c = 1/64$.

For the case N=3, there is no control vertex $c_8$ ($c_8 = c_2$) and the second column of the matrix $S_{11}$ is equal to $(0, 0, c, e, 0, c, e)^T$.

The eigenstructure of the matrix $S_{12}$ can be computed manually, since this matrix has a simple form. Its eigenvalues are:

$$\Lambda = \text{diag}(1/64, 1/8, 1/16, 1/32, 1/8, 1/16, 1/32),$$

with corresponding eigenvectors:

$$W_1 = \begin{pmatrix} 1 & 1 & 2 & 11 & 1 & 2 & 11 \\ 0 & 1 & 1 & 2 & 0 & 0 & 0 \\ 0 & 1 & 0 & -1 & 0 & 0 & 0 \\ 0 & 1 & -1 & 2 & 0 & 0 & 0 \\ 0 & 0 & 0 & 0 & 1 & 1 & 2 \\ 0 & 0 & 0 & 0 & 1 & 0 & -1 \\ 0 & 0 & 0 & 0 & 1 & -1 & 2 \end{pmatrix}.$$

The inverse $W_1^{-1}$ of this matrix is easily computed manually. The other two matrices appearing in $\overline{A}$ are:

$$S_{21} = \begin{pmatrix} 0 & 0 & 0 & 0 & f & 0 & 0 & 0 \\ 0 & 0 & 0 & 0 & d & e & 0 & 0 \\ 0 & 0 & 0 & 0 & f & f & 0 & 0 \\ 0 & 0 & 0 & 0 & e & d & e & 0 \\ 0 & 0 & 0 & 0 & 0 & f & f & 0 \\ 0 & 0 & 0 & e & d & 0 & 0 & 0 \\ 0 & 0 & 0 & f & f & 0 & 0 & 0 \\ 0 & 0 & e & d & e & 0 & 0 & 0 \\ 0 & 0 & f & f & 0 & 0 & 0 & 0 \end{pmatrix},$$

$$S_{22} = \begin{pmatrix} f & f & 0 & 0 & f & 0 & 0 \\ e & d & e & 0 & e & 0 & 0 \\ 0 & f & f & 0 & 0 & 0 & 0 \\ 0 & e & d & e & 0 & 0 & 0 \\ 0 & 0 & f & f & 0 & 0 & 0 \\ e & e & 0 & 0 & d & e & 0 \\ 0 & 0 & 0 & 0 & f & f & 0 \\ 0 & 0 & 0 & 0 & e & d & e \\ 0 & 0 & 0 & 0 & 0 & f & f \end{pmatrix}.$$

APPENDIX B

Regular Quadrilateral Eigenbasis Functions

This appendix computes the bi-cubic spline pieces $x(u, v, k)$ of the eigenbasis defined in equation (13). The vector $b(u, v)$ contains the 16 tensor B-spline basis functions (i=1, ... 16):

$$b_i(u, v) = N_{(i-1)\%4}(u) N_{(i-1)/4}(v),$$

where "%" and "/" stand for the remainder and the division respectively. The functions $N_i(t)$ are the uniform B-spline basis functions:

$$6N_0(t) = 1 - 3t + 3t^2 - t^3,$$

$$6N_1(t) = 4 - 6t^2 + 3t^3,$$

$$6N_2(t) = 1 + 3t + 3t^2 - 3t^3$$

and $$6N_3(t) = t^3.$$

The projection matrices $P_1$, $P_2$, and $P_3$ are defined by introducing the following three permutation vectors:

$$q^1 = (8, 7, 2N+5, 2N+13, 1, 6, 2N+4, 2N+12, 4, 5, 2N+3, 2N+11, 2N+7, 2N+6, 2N+2, 2N+10),$$

$$q^2 = (1, 6, 2N+4, 2N+12, 4, 5, 2N+3, 2N+11, 2N+7, 2N+6, 2N+2, 2N+10, 2N+16, 2N+15, 2N+14, 2N+9),$$

$$q^3 = (2, 1, 6, 2N+4, 3, 4, 5, 2N+3, 2N+8, 2N+7, 2N+6, 2N+2, 2N+17, 2N+16, 2N+15, 2N+14).$$

Since for the case N=3 the vertices $c_2$ and $c_8$ are the same vertex, $q^1_1 = 2$ instead of 8 for N=3. Using these permutation vectors, each bi-cubic spline is:

$$x_i(u, v, k) = \sum_{j=1}^{16} V_{q^k_{l_1}, i} b_j(u, v),$$

where i=1, ..., K and V are the eigenvectors of the subdivision matrix.

APPENDIX C

Subdivision Matrices for Loop Subdivision Rules and Their Eigenstructures

The subdivision matrix $$S = \begin{pmatrix} a_N & b_N & b_N & b_N & b_N & \cdots & b_N & b_N & b_N \\ c & c & d & 0 & 0 & \cdots & 0 & 0 & d \\ c & d & c & d & 0 & \cdots & 0 & 0 & 0 \\ & & \vdots & & & \ddots & & \vdots & \\ c & d & 0 & 0 & 0 & \cdots & 0 & d & c \end{pmatrix},$$

is composed of three blocks. The upper left block contains the "extraordinary rules" of Loop's scheme. It is equal to $$a_N = 1 - \alpha(N),\ b_N = \alpha(N)/N,\ c = \tfrac{3}{8}\ \text{and}\ d = \tfrac{1}{8}.$$

where $$\alpha(N) = \frac{5}{8} - \frac{(3 + 2\cos(2\pi/N))^2}{64}.$$

Using shorthand notation:

$$\hat{S} = \begin{pmatrix} a_N & Nb_N & 0 & 0 & \cdots & 0 \\ c & c+2d & 0 & 0 & \cdots & 0 \\ 0 & 0 & f(1) & 0 & \cdots & 0 \\ 0 & 0 & 0 & f(2) & \cdots & 0 \\ & & \cdots & & \ddots & \cdots \\ 0 & 0 & 0 & 0 & \cdots & f(N-1) \end{pmatrix},$$

Fourier transformation of the matrix yields:

$$f(k) = \tfrac{3}{8} + \tfrac{2}{8} \cos(2\pi k/N).$$

where $$\mu_1 = 1,\ \mu_2 = \tfrac{5}{8} - \alpha(N),\ \mu_3 = f(1), \ldots, \mu_{N+1} = f(N-1).$$

The eigenvalues and the eigenvectors of the transformed matrix are easy to compute because of the almost-diagonal structure. They are:

$$\mu_3^2 = \mu_2$$

The eigenvalues $U_{N-1}$ to $f(k) = f(N-k)$ are of multiplicity two, since $\mu_{2+N/2}$, except for when N is even, then $$\hat{U}_0 = \begin{pmatrix} 1 & -\tfrac{8}{3}\alpha_N & 0 & 0 & \cdots & 0 \\ 1 & 1 & 0 & 0 & \cdots & 0 \\ 0 & 0 & 1 & 0 & \cdots & 0 \\ 0 & 0 & 0 & 1 & \cdots & 0 \\ & & & \vdots & \ddots & \vdots \\ 0 & 0 & 0 & 0 & \cdots & 1 \end{pmatrix}.$$

is only of multiplicity one. The corresponding eigenvectors are (when stored column wise) S.

By Fourier transforming these vectors back, we can compute the eigenvectors of the matrix $$U_0 = \begin{pmatrix} 1 & -\tfrac{8}{3}\alpha_N & 0 & 0 & \cdots & 0 \\ 1 & 1 & 1 & 1 & \cdots & 1 \\ 1 & 1 & E(1) & E(2) & \cdots & E(N-1) \\ 1 & 1 & E(2) & E(4) & \cdots & E(2(N-1)) \\ & & \vdots & & \ddots & \vdots \\ 1 & 1 & E(N-1) & E(2(N-1)) & \cdots & E((N-1)(N-1)) \end{pmatrix},$$

The result is $$E(k) = \exp(2\pi i k/N)$$

where $\mu_{3+k}$. These are complex valued vectors. Real-valued vectors can be obtained by combining the two columns of each eigenvalue to obtain two corresponding real eigenvalues. For example, the two real eigenvectors for the eigenvalue $$k = 0, \ldots, N-1,$$

$$v_k^T = (0, C(0), C(k), C(2k), \ldots, C((N-1)k)),$$

and $$w_k^T = (0, S(0), S(k), S(2k), \ldots, S((N-1)k)),$$

are:

$$C(k)=\cos(2\pi k/N)$$

and $$S(k)=\sin(2\pi k/N).$$

where $$\Sigma=\text{diag}(1, \mu_2, \mu_3, \mu_3, \ldots, \mu_{(N-1)/2}, \mu_{(N-1)/2}),$$

The corresponding matrix of diagonal vectors is equal to $$\Sigma=\text{diag}(1, \mu_2, \mu_3, \mu_3, \ldots, \mu_{N/2-1}, \mu_{N/2-1}, \tfrac{1}{8}),$$

when N is odd, and is equal to S when N is even. This completes the eigenanalysis of the matrix A. The remaining blocks of the matrix are:

$$S_{12} = \frac{1}{16}\begin{pmatrix} 2 & 0 & 0 & 0 & 0 \\ 1 & 1 & 1 & 0 & 0 \\ 0 & 0 & 2 & 0 & 0 \\ 1 & 0 & 0 & 1 & 1 \\ 0 & 0 & 0 & 0 & 2 \end{pmatrix} \text{ and}$$

$$S_{11} = \frac{1}{16}\begin{pmatrix} 2 & 6 & 0 & 0 & \cdots & 0 & 0 & 6 \\ 1 & 10 & 1 & 0 & \cdots & 0 & 0 & 1 \\ 2 & 6 & 6 & 0 & \cdots & 0 & 0 & 0 \\ 1 & 1 & 0 & 0 & \cdots & 0 & 1 & 10 \\ 2 & 0 & 0 & 0 & \cdots & 0 & 6 & 6 \end{pmatrix}.$$

The matrix $v_1=v_2=v_3=\tfrac{1}{8}$, and $v_4=v_5=\tfrac{1}{16}$, has the following eigenvalues:

$$\Lambda=\text{diag}(\tfrac{1}{8}, \tfrac{1}{8}, \tfrac{1}{8}, \tfrac{1}{16}, \tfrac{1}{16}),$$

i.e., $$W_1 = \begin{pmatrix} 0 & -1 & 1 & 0 & 0 \\ 1 & -1 & 1 & 0 & 1 \\ 1 & 0 & 0 & 0 & 0 \\ 0 & 0 & 1 & 1 & 0 \\ 0 & 1 & 0 & 0 & 0 \end{pmatrix}.$$

And the corresponding eigenvectors are:

$$S$$

The following problem might occur when trying to solve Eq. 4. When N is even, the column corresponding to the last eigenvector of $\tfrac{1}{8}$ gives rise to a degenerate linear system, since the eigenvalue is $u_1$. Fortunately, the system can be solved manually, and in this case the last column of $$u_{1,N+1}{}^T=(0, 8, 0, -8, 0).$$

is given by:

$$\bar{A}$$

The remaining two blocks of the matrix are $$S_{21} = \frac{1}{8}\begin{pmatrix} 0 & 3 & 0 & 0 & \cdots & 0 & 0 & 1 \\ 0 & 3 & 0 & 0 & \cdots & 0 & 0 & 0 \\ 0 & 3 & 1 & 0 & \cdots & 0 & 0 & 0 \\ 0 & 1 & 0 & 0 & \cdots & 0 & 0 & 3 \\ 0 & 0 & 0 & 0 & \cdots & 0 & 0 & 3 \\ 0 & 0 & 0 & 0 & \cdots & 0 & 1 & 3 \end{pmatrix} \text{ and } S_{22} = \frac{1}{8}\begin{pmatrix} 3 & 1 & 0 & 0 & 0 \\ 1 & 3 & 1 & 0 & 0 \\ 0 & 1 & 3 & 0 & 0 \\ 3 & 0 & 0 & 1 & 0 \\ 1 & 0 & 0 & 3 & 1 \\ 0 & 0 & 0 & 1 & 3 \end{pmatrix}.$$

APPENDIX D

Regular Triangular Spline Basis Functions

The triangular surface defined by the control vertices shown in FIG. 16 can be expressed in terms of twelve basis functions. Loop's scheme on the regular part of the mesh is a box spline, hence, corresponding Bezier patch control vertices of the triangle exist. Lai has developed FORTRAN code (see M. J. Lai, "Fortran Subroutines for B-Nets of Box Splines on Three- and Four-Directional Meshes", *Numerical Algorithms*, 2:33–38, 1992) which provides the conversion to the control vertices for the quartic triangular Bezier patches corresponding to the box spline. Lai's code (with L=2, M=2 and N=2) produces a matrix M which converts from the Bezier control vertices of the patch to the twelve control vertices shown in FIG. 17. The twelve basis functions for our triangular patch are derived by multiplying fifteen multivariate Bernstein polynomials by a matrix:

$$b^T(v, w)=\tfrac{1}{2}(u^4+2u^3v, u^4+2u^3w, u^4+2u^3w+6u^3v+6u^2vw+12u^2v^2+6uv^2w+6uv^3+2v^3w+v^4,$$

$$6u^4+24u^3w+24u^2w^2+8uw^3+w^4+24u^3v+60u^2vw+36uvw^2+$$

$$6vw^3+24u^2v^2+36uv^2w+12v^2w^2+8uv^36v^3w+v^4, u^4+6u^3w+12u^2w^2+6uw^3+w^4+2u^3v+6u^2vw+6$$

$$uvw^2+2vw^3, 2uv^3+v^4, u^4+6u^3w+12u^2w^2+6uw^3+w^4+8u^3v+36u^2vw+$$

$$36uvw^2+8vw^3+24u^2v^2+60uv^2w+24v^2w^2+24uv^3+24v^3w+6v^4,$$

$$u^4+8u^3w+24u^2w^2+24uw^3+6w^4+6u^3v+36u^2vw+60uvw^2+$$

$$24vw^3+12u^2v^2+36uv^2w+24v^2w^2+6uv^3+8v^3w+v^4, 2vw^3+w^4, 2v^3w+v^4,$$

$$2uw^3+w^4+6uvw^2+6vw^3+6uv^2w+12v^2w^2+2uv^3+6u^3w+v^4, w^4+2vw^3),$$

Carrying out this multiplication yields A where u=1−v−w.

APPENDIX E

Eigenstructure Values for Catmull-Clark Subdivision

Eigenstructure Values for N=3
Total subdivision matrix:
Eigenvalues:
  0: 1
  1: 0.410097
  2: 0.410097
  3: 0.166667
  4: 0.152403
  5: 0.152403
  6: 0
Eigenvectors:
  1.000 1.000 1.000 1.000 1.000 1.000 1.000
  0.000 0.640 0.500 −0.320 −1.000 −0.320 0.500
  0.000 0.000 0.866 0.555 0.000 −0.555 −0.866

−0.556 0.000 1.667 0.000 1.667 0.000 1.667
0.000 0.000 0.866 −0.338 0.000 0.338 −0.866
0.000 −0.390 0.500 0.195 −1.000 0.195 0.500
1.000 −1.000 1.000 −1.000 1.000 −1.000 1.000

Total inverse subdivision matrix:
Eigenvalues:
  0: 1
  1: 0.410097
  2: 0.410097
  3: 0.166667
  4: 0.152403
  5: 0.152403
  6: 0.125
  7: 0.125
  8: 0.0625
  9: 0.0625
  10: 0.03125
  11: 0.03125
  12: 0.015625
  13: 0
Eigenvectors:
  0.375 0.167 0.042 0.167 0.042 0.167 0.042
  0.000 0.000 0.000 0.000 0.000 0.000 0.000
  0.000 0.000 0.219 0.560 0.000 −0.560 −0.219
  0.000 0.000 0.000 0.000 0.000 0.000 0.000
  0.000 0.647 0.126 −0.323 −0.252 −0.323 0.126
  0.000 0.000 0.000 0.000 0.000 0.000 0.000
  −0.450 0.000 0.150 0.000 0.150 0.000 0.150
  0.000 0.000 0.000 0.000 0.000 0.000 0.000
  0.000 0.000 0.359 −0.560 0.000 0.560 −0.359
  0.000 0.000 0.000 0.000 0.000 0.000 0.000
  0.000 −0.647 0.207 0.323 −0.414 0.323 0.207
  0.000 0.000 0.000 0.000 0.000 0.000 0.000
  3.000 1.333 −1.167 −2.333 −1.167 1.333 −2.000
  0.000 0.000 0.000 0.000 0.167 0.667 0.167
  3.000 1.333 −2.000 1.333 −1.167 −2.333 −1.167
  0.000 0.167 0.667 0.167 0.000 0.000 0.000
  0.000 −1.312 0.000 1.312 −1.437 0.000 1.437
  0.000 0.500 0.000 −0.500 0.000 0.000 0.000
  0.000 −1.312 1.437 0.000 −1.437 1.312 0.000
  0.000 0.000 0.000 0.000 0.500 0.000 −0.500
  1.615 −0.720 −0.077 −0.227 −0.077 −0.720 0.206
  0.000 0.000 0.000 0.000 0.167 −0.333 0.167
  1.615 −0.720 0.206 −0.720 −0.077 −0.227 −0.077
  0.000 0.167 −0.333 0.167 0.000 0.000 0.000
  −41.897 19.683 −3.659 14.158 2.214 14.158 −3.659
  1.000 −3.000 3.000 −1.000 −3.000 3.000 −1.000
  0.375 −0.167 0.042 −0.167 0.042 −0.167 0.042
  0.000 0.000 0.000 0.000 0.000 0.000 0.000

Eigenstructure Values for N=5
Total subdivision matrix:
Eigenvalues:
  0: 1
  1: 0.549988
  2: 0.549988
  3: 0.340107
  4: 0.340107
  5: 0.322474
  6: 0.183765
  7: 0.183765
  8: 0.113639
  9: 0.113639
  10: 0.0775255
Eigenvectors:
  1.000 1.000 1.000 1.000 1.000 1.000 1.000
  1.000 1.000 1.000 1.000 0.000 0.000 0.951
  1.141 1.539 0.705 0.000 −0.705 −1.539 −1.141

−0.951 0.000 1.200 1.309 0.371 −0.500 −0.971
−1.618 −0.971 −0.500 0.371 1.309 0.000 0.000
0.588 0.212 −0.363 −0.343 0.000 0.343 0.363
−0.212 −0.588 0.000 0.360 0.191 −0.292 −0.500
0.111 0.618 0.111 −0.500 −0.292 0.191
−1.206 0.935 2.290 0.935 2.290 0.935 2.290
0.935 2.290 0.935 2.290 0.000 0.000 0.588
−0.156 −0.363 0.252 0.000 −0.252 0.363 0.156
−0.588 0.000 −0.265 0.191 0.214 −0.500 −0.082
0.618 −0.082 −0.500 0.214 0.191 0.000 0.000
0.951 −0.519 1.539 −0.321 0.000 0.321 −1.539
0.519 −0.951 0.000 −0.545 1.309 −0.169 −0.500
0.441 −1.618 0.441 −0.500 −0.169 1.309 0.166
−0.535 1.310 −0.535 1.310 −0.535 1.310 −0.535
1.310 −0.535 1.310

Total inverse subdivision matrix:
Eigenvalues:
  0: 1
  1: 0.549988
  2: 0.549988
  3: 0.340107
  4: 0.340107
  5: 0.322474
  6: 0.183765
  7: 0.183765
  8: 0.125
  9: 0.125
  10: 0.113639
  11: 0.113639
  12: 0.0775255
  13: 0.0625
  14: 0.0625
  15: 0.03125
  16: 0.03125
  17: 0.015625
Eigenvectors:
  0.500 0.080 0.020 0.080 0.020 0.080 0.020
  0.080 0.020 0.080 0.020 0.000 0.000 0.000
  0.000 0.000 0.000 0.000 0.000 0.229 0.063
  0.071 −0.024 −0.185 −0.077 −0.185 −0.024 0.071
  0.063 0.000 0.000 0.000 0.000 0.000 0.000
  0.000 0.000 0.000 0.045 0.218 0.073 0.135
  0.000 −0.135 −0.073 −0.218 −0.045 0.000 0.000
  0.000 0.000 0.000 0.000 0.000 0.000 0.000
  0.261 0.376 −0.161 −0.608 0.000 0.608 0.161
  −0.376 −0.261 0.000 0.000 0.000 0.000 0.000
  0.000 0.000 0.000 0.640 0.085 −0.517 −0.222
  0.198 0.274 0.198 −0.222 −0.517 0.085 0.000
  0.000 0.000 0.000 0.000 0.000 0.000 −0.377
  0.047 0.029 0.047 0.029 0.047 0.029 0.047
  0.029 0.047 0.029 0.000 0.000 0.000 0.000
  0.000 0.000 0.000 0.000 0.000 0.355 −0.376
  −0.219 0.608 0.000 −0.608 0.219 0.376 −0.355
  0.000 0.000 0.000 0.000 0.000 0.000 0.000
  0.000 −0.640 0.115 0.517 −0.302 −0.198 0.373
  −0.198 −0.302 0.517 0.115 0.000 0.000 0.000
  0.000 0.000 0.000 0.000 1.667 0.267 −0.400
  0.267 0.433 −3.400 0.433 0.267 −0.400 0.267
  −0.400 0.000 0.167 0.667 0.167 0.000 0.000
  0.000 1.667 0.267 0.433 −3.400 0.433 0.267
  −0.400 0.267 −0.400 0.267 −0.400 0.000 0.000
  0.000 0.000 0.167 0.667 0.167 0.000 0.000
  0.100 −0.218 0.162 −0.135 0.000 0.135 −0.162
  0.218 −0.100 0.000 0.000 0.000 0.000 0.000
  0.000 0.000 0.000 −0.229 0.137 −0.071 −0.053
  0.185 −0.170 0.185 −0.053 −0.071 0.137 0.000
  0.000 0.000 0.000 0.000 0.000 0.000 0.277

−0.143 0.087 −0.143 0.087 −0.143 0.087 −0.143
0.087 −0.143 0.087 0.000 0.000 0.000 0.000
0.000 0.000 0.000 0.000 0.191 −0.573 1.527
1.509 0.000 1.509 −1.527 0.573 −0.191 0.000
0.000 0.500 0.000 −0.500 0.000 0.000 0.000
0.000 −1.527 1.509 0.000 −1.509 1.527 −0.573
0.191 0.000 −0.191 0.573 0.000 0.000 0.000
0.000 0.500 0.000 −0.500 −0.507 0.286 −0.426
0.786 −0.426 0.286 −0.090 0.111 −0.040 0.111
−0.090 0.000 0.000 0.000 0.000 0.167 −0.333
0.167 −0.507 0.111 −0.090 0.286 −0.426 0.786
−0.426 0.286 −0.090 0.111 −0.040 0.000 0.167
−0.333 0.167 0.000 0.000 0.000 5.206 −1.418
2.537 −7.427 8.539 −7.427 2.537 −1.418 0.407
0.943 0.407 1.000 −3.000 3.000 −1.000 −3.000
3.000 −1.000

Other aspects, advantages, and modifications are within the scope of the following claims.

What is claimed is:

1. A computer-based method for evaluating a property of any location on a computer generated surface, the surface being specified by a set of patches, each patch being defined by a set of control vertices having a corresponding set of subdivision rules and admitting a regular parameterization for regular patches corresponding to regular sets of control vertices, the method comprising:

receiving input specifying coordinates of the control vertices defining a patch of the surface;

determining whether one of the control vertices comprises a vertex having an extraordinary valence;

projecting the specified control vertices into a space of predefined eigenbasis functions corresponding to eigenvectors derived from a matrix representation of the subdivision rules;

performing an exact surface evaluation of any desired location on the patch, without the need to modify the patch by subdividing, as a function of the valence of one of the control vertices, the location in the parameter space of the patch, and the set of projected control vertices; and storing the evaluated location in a computer memory.

2. The computer-based method of claim 1, wherein the subdivision rules comprise Catmull-Clark subdivision rules.

3. The computer-based method of claim 1, wherein the subdivision rules comprise Loop subdivision rules.

4. The computer-based method of claim 1, wherein the evaluating comprises determining coordinates of the location.

5. The computer-based method of claim 1, wherein the evaluating comprises determining a derivative of any order of the surface at the location.

6. The computer-based method of claim 1, further comprising processing the evaluation to determine a display characteristic.

7. The computer-based method of claim 6, wherein the display characteristic comprises at least one of the following: shading and texture mapping.

8. The computer-based method of claim 1, wherein the evaluating comprises evaluating according substantially to:

$$s(u, v) = \sum_{i=1}^{K} \varphi_i(u, v) p_i.$$

9. The computer-based method of claim 1, wherein the evaluating comprises evaluating according substantially to:

$$s(v,w) = \hat{C}_0^T \Phi(v,w).$$

10. The computer-based method of claim 1, further comprising producing a graphics display based on the stored evaluation.

11. The computer-based method of claim 1, wherein the projecting comprises reading data from a file, the data including inverse eigenvector matrix data of the eigenspace.

12. The computer-based method of claim 1, wherein the evaluating comprises reading data from a file, the data including eigenvalue and eigenvector data of the eigenspace.

13. The computer-based method of claim 1, wherein the receiving input comprises receiving input via a graphical user interface.

14. The computer-based method of claim 1, wherein the receiving input comprises receiving input via program variables.

15. A computer-based method of evaluating any location of a computer generated surface, the location being specified by a set of parameters, the surface being described by a set of control vertices having a corresponding set of subdivision rules and admitting a parameterization of regular sets of control vertices, one of the control vertices being a vertex having an extraordinary valence, the method comprising:

receiving input specifying coordinates of the control vertices;

determining whether one of the control vertices comprises a vertex having an extraordinary valence;

performing an exact surface evaluation of any desired location of the surface as a function of the control vertices using predefined eigenbasis functions without explicitly subdividing the control vertices in accordance with the subdivision rules; and storing the evaluated location in a computer memory.

16. The computer-based method of claim 15, wherein the evaluating comprises projecting the coordinates of the control vertices into an eigenspace derived from a matrix representation of the subdivision rules.

17. The computer-based method of claim 15, wherein the evaluating comprises determining which of a hierarchically nested set of tiles of the surface contains the location.

18. The computer-based method of claim 15, wherein the evaluating comprises evaluating a set of eigenbasis functions derived from a matrix representation of the subdivision rules.

19. The computer-based method of claim 15, wherein the subdivision rules comprise Catmull-Clark subdivision rules.

20. The computer-based method of claim 15, wherein the subdivision rules comprise Loop subdivision rules.

21. The computer-based method of claim 15, wherein the evaluating comprises determining coordinates of the location.

22. The computer-based method of claim 15, wherein the evaluating comprises determining a derivative of any order of the surface at the location.

23. The computer-based method of claim 15, further comprising processing the stored evaluation to determine a display characteristic.

24. The computer-based method of claim 15, wherein the display characteristic comprises at least one of the following: shading and texture mapping.

25. The computer-based method of claim 15, further comprising producing a graphics display based on the stored evaluation.

26. The computer-based method of claim 15, wherein the receiving input comprises receiving input via a graphical user interface.

27. A computer program product, disposed on a computer readable medium, for evaluating a property of any location on a computer generated surface, the surface being specified by a set of patches, each patch being defined by a set of control vertices having a corresponding set of subdivision rules and admitting a regular parameterization for regular patches corresponding to regular sets of control vertices, the computer program product comprising instructions for causing a computer to:

receive input specifying coordinates of the control vertices defining a patch of the surface;

determine whether one of the control vertices comprises a vertex having an extraordinary valence;

project the specified control vertices into a space of predefined eigenbasis functions corresponding to eigenvectors derived from a matrix representation of the subdivision rules;

exactly evaluate any desired location on the patch, without the need to modify the patch by subdividing, as a function of a valence of one of the control vertices, the location in the parameter space of the patch, and the set of projected control vertices; and store the evaluated location in a computer memory.

28. The computer program product of claim 27, wherein the instructions that cause the computer to evaluate comprise instructions that cause the computer to determine coordinates of the location.

29. The computer program product of claim 27, wherein the instructions that cause the computer to evaluate comprise instructions that cause the computer to determine a derivative of any order of the surface at the location.

30. The computer program product of claim 27, further comprising instructions that cause the computer to produce a graphics display based on the stored evaluation.

31. The computer program product of claim 27, further comprising a data table that includes inverse eigenvector matrix data.

32. The computer program product of claim 27, further comprising a data table that includes eigenvalue and eigenvector data.

33. The computer program product of claim 27, wherein the subdivision rules comprise Catmull-Clark subdivision rules.

34. The computer program product of claim 27, wherein the subdivision rules comprise Loop subdivision rules.

35. The computer program product of claim 27, wherein the instruction that cause the computer to evaluate comprise instructions that cause the computer to evaluate according substantially to:

$$s(u, v) = \sum_{i=1}^{K} \varphi_i(u, v) p_i.$$

36. The computer-based method of claim 27, wherein the instructions that cause the computer to evaluate comprise instructions that cause the computer to evaluate according substantially to:

$$s(v,w) = \hat{C}_0^T \Phi(v,w).$$

37. The computer program product of claim 27, further comprising instructions that cause the computer to produce a graphics display based on the stored evaluation.

38. The computer program product of claim 27, further comprising instructions that cause the computer to process the stored evaluation to determine a display characteristic.

39. The computer program product of claim 38, wherein the display characteristic comprises at least one of the following: shading and texture mapping.

40. The computer program product of claim 27, wherein the instructions that cause the computer to receive input comprise instructions that cause the computer to receive input via a graphical user interface.

41. The computer program product of claim 27, wherein the instructions that cause the computer to receive input comprise instructions that cause the computer to receive input via program variables.

42. A computer-based method for evaluating any location on a computer generated surface, the surface being specified by a set of patches, each patch being defined by a set of control vertices having a corresponding set of subdivision rules, the method comprising:

receiving input specifying coordinates of the control vertices defining a patch of the surface;

determining whether one of the control vertices comprises a vertex having an extraordinary valence;

performing an exact surface evaluation of any desired location on the patch without subdividing the patch using predefined eigenbasis functions; and storing the evaluated location in a computer memory.

43. A computer-based method for evaluating any point on a computer generated surface, the surface being specified by a set of patches, each patch being defined by a set of control vertices, the method comprising:

receiving input specifying coordinates of the control vertices defining a patch of the surface;

determining whether one of the control vertices comprises a vertex having an extraordinary valence;

performing an exact surface evaluation of any desired point on the patch without the need to modify the patch by subdividing using predefined eigenbasis functions; and storing the evaluated location in a computer memory.

44. A computer apparatus for evaluating any point on a computer generated surface, the surface being specified by a set of patches, each patch being defined by a set of control vertices, the computer apparatus comprising:

an input device to receive input specifying coordinates of the control vertices defining a patch of the surface;

a processor programmed to evaluate any desired point on the patch without the need to modify the patch by subdividing by determining whether one of the control vertices comprises a vertex having an extraordinary valence and performing an exact surface evaluation of the point on the patch using predefined eigenbasis functions; and a storage device for storing the evaluated location.

45. A computer apparatus for evaluating any location on a computer generated surface, the surface being specified by a set of patches, each patch being defined by a set of control vertices having a corresponding set of subdivision rules, the method comprising:

an input device to receive input specifying coordinates of the control vertices defining a patch of the surface;

a processor programmed to evaluate any location on the patch without subdividing the patch by determining whether one of the control vertices comprises a vertex having an extraordinary valence and performing an exact surface evaluation of the point on the patch using predefined eigenbasis functions; and a storage device for storing the evaluated location.

46. A computer-based method for evaluating a property of any location on a computer generated surface, the surface being specified by a set of patches, each patch being defined by a set of control vertices having a corresponding set of subdivision rules and admitting a regular parameterization for regular patches corresponding to regular sets of control vertices, the method comprising:

- receiving input specifying coordinates of the control vertices defining a patch of the surface;
- determining whether one of the control vertices comprises a vertex having an extraordinary valence;
- projecting the specified control vertices into a space of predefined eigenbasis functions corresponding to eigenvectors derived from a matrix representation of the subdivision rules;
- performing an exact surface evaluation of any desired location on the patch, without the need to modify the patch by subdividing, as a function of a valence of one of the control vertices, the location in the parameter space of the patch, and the set of projected control vertices;
- storing the evaluated location in a computer memory; and
- wherein the evaluating comprises evaluating according substantially to $$s(u, v) = \sum_{i=1}^{K} \varphi_i(u, v)\rho_i.$$

47. A computer-based method for evaluating a property of any location on a computer generated surface, the surface being specified by a set of patches, each patch being defined by a set of control vertices having a corresponding set of subdivision rules and admitting a regular parameterization for regular patches corresponding to regular sets of control vertices, the method comprising:

- receiving input specifying coordinates of the control vertices defining a patch of the surface;
- determining whether one of the control vertices comprises a vertex having an extraordinary valence;
- projecting the specified control vertices into a space of predefined eigenbasis functions corresponding to eigenvectors derived from a matrix representation of the subdivision rules;
- performing an exact surface evaluation of any desired location on the patch, without the need to modify the patch by subdividing, as a function of a valence of one of the control vertices, the location in the parameter space of the patch, and the set of projected control vertices;
- storing the evaluated location in a computer memory; and
- wherein the evaluating comprises evaluating according substantially to $$s(u,w) = \hat{C}_0^T \Phi(u, w).$$

48. A computer program product, disposed on a computer readable medium, for evaluating a property of any location on a computer generated surface, the surface being specified by a set of patches, each patch being defined by a set of control vertices having a corresponding set of subdivision rules and admitting a regular parameterization for regular patches corresponding to regular sets of control vertices, the computer program product comprising instructions for causing a computer to:

- receive input specifying coordinates of the control vertices defining a patch of the surface;
- project the specified control vertices into a space of predefined eigenbasis functions corresponding to eigenvectors derived from a matrix representation of the subdivision rules;
- evaluate any location on the patch, without the need to modify the patch, as a function of a valence of one of the control vertices, the location in the parameter space of the patch, and the set of projected control vertices, wherein one of the control vertices comprises a vertex having an extraordinary valence; and
- store the evaluated location in a computer memory; and
- wherein the instruction that cause the computer to evaluate comprise instructions that cause the computer to evaluate according substantially to:

$$s(u, v) = \sum_{i=1}^{K} \varphi_i(u, v)\rho_i.$$

49. A computer program product, disposed on a computer readable medium, for evaluating a property of any location on a computer generated surface, the surface being specified by a set of patches, each patch being defined by a set of control vertices having a corresponding set of subdivision rules and admitting a regular parameterization for regular patches corresponding to regular sets of control vertices, the computer program product comprising instructions for causing a computer to:

- receive input specifying coordinates of the control vertices defining a patch of the surface;
- determine whether one of the control vertices comprises a vertex having an extraordinary valence;
- project the specified control vertices into a space of predefined eigenbasis functions corresponding to eigenvectors derived from a matrix representation of the subdivision rules;
- exactly evaluate any location on the patch, without the need to modify the patch by subdividing, as a function of a valence of one of the control vertices, the location in the parameter space of the patch, and the set of projected control vertices;
- store the evaluated location in a computer memory; and
- wherein the instruction that cause the computer to evaluate comprise instructions that cause the computer to evaluate according substantially to:

$$s(v,w) = \hat{C}_0^T \Phi(v,w).$$

* * * * *

UNITED STATES PATENT AND TRADEMARK OFFICE
CERTIFICATE OF CORRECTION

PATENT NO.    : 6,389,154 B1
DATED         : May 14, 2002
INVENTOR(S)   : Jos Stam It is certified that error appears in the above-identified patent and that said Letters Patent is hereby corrected as shown below:

Column 19,
Lines 47-51, delete equations, insert $$\mathbf{u}_{2N}^T = (0,1,0,-1,0,1,0,\cdots,-1,0) \text{ and}$$
$$\mathbf{u}_{2N+1}^T = (0,0,1,0,-1,0,1,\cdots,0,-1).$$

Column 23,
Line 62, delete equation, insert $\mathbf{u}_{1,N+1}^T = (0,8,0,-8,0)$.

Signed and Sealed this

Eleventh Day of March, 2003

JAMES E. ROGAN
*Director of the United States Patent and Trademark Office*